United States Patent
Woo et al.

(10) Patent No.: US 7,668,262 B2
(45) Date of Patent: Feb. 23, 2010

(54) SYSTEMS, METHODS, AND APPARATUSES FOR COARSE SPECTRUM-SENSING MODULES

(75) Inventors: Wangmyong Woo, Suwanee, GA (US);
Chang-Ho Lee, Marietta, GA (US);
Jungsuk Lee, Gyunggi-Do (KR);
Haksun Kim, Daejeon (KR)

(73) Assignee: Samsung Electro-Mechanics (KR)

( * ) Notice: Subject to any disclaimer, the term of this patent is extended or adjusted under 35 U.S.C. 154(b) by 620 days.

(21) Appl. No.: 11/458,275

(22) Filed: Jul. 18, 2006

(65) Prior Publication Data

US 2007/0091720 A1   Apr. 26, 2007

Related U.S. Application Data

(60) Provisional application No. 60/729,037, filed on Oct. 21, 2005.

(51) Int. Cl.
*H04L 27/06* (2006.01)
(52) U.S. Cl. ....................................................... 375/343
(58) Field of Classification Search .................. 375/343
See application file for complete search history.

(56) References Cited

U.S. PATENT DOCUMENTS

| | | | |
|---|---|---|---|
| 4,501,020 A | | 2/1985 | Wakeman |
| 5,282,227 A | | 1/1994 | Crawford |
| 5,386,495 A | | 1/1995 | Wong et al. |
| 5,552,792 A | | 9/1996 | Smith |
| 5,638,399 A | | 6/1997 | Schuchman et al. |
| 5,784,285 A | * | 7/1998 | Tamaki et al. ................. 702/66 |
| 5,974,042 A | | 10/1999 | Frank et al. |
| 6,219,373 B1 | * | 4/2001 | Lee et al. ..................... 375/130 |
| 6,735,238 B1 | * | 5/2004 | McCorkle .................... 375/130 |

(Continued)

FOREIGN PATENT DOCUMENTS

EP    0266962 A2    10/1987

(Continued)

OTHER PUBLICATIONS

Yoon, "Power measurement using the wavelet transform", IEEE Transactions on Instrumentation and Measurement, vol. 47, Issue 5, Oct. 1998 pp. 1205-1210.*

(Continued)

*Primary Examiner*—Juan A Torres
(74) *Attorney, Agent, or Firm*—Sutherland Asbill & Brennan LLP

(57) ABSTRACT

Systems, methods, and apparatuses are provided for coarse-sensing modules that are operative for providing initial determinations of spectrum occupancy. The coarse-sensing modules may include a wavelet waveform generator providing a plurality of wavelet pulses, and a multiplier that combines the wavelet pulses with an input signal to form a correlation signal. The coarse sensing modules may further include an integrator that receives the generated correlation signal from the multiplier, where the integrator determines correlation values from integrating the correlation signal, and a spectrum recognition module in communication with the integrator that determines an available spectrum segment based at least in part on the correlation values. In addition, the spectrum recognition module may determine an available spectrum segment by utilizing information from a spectrum usage database, where the spectrum usage database includes information associated with one or more known signal types.

21 Claims, 23 Drawing Sheets

U.S. PATENT DOCUMENTS

| | | | |
|---|---|---|---|
| 6,912,372 B2* | 6/2005 | McCorkle et al. | 455/39 |
| 6,928,046 B1 | 8/2005 | Sajadieh et al. | |
| 7,272,265 B2* | 9/2007 | Kouri et al. | 382/260 |
| 7,408,973 B2* | 8/2008 | McCorkle et al. | 375/130 |
| 7,415,080 B2 | 8/2008 | Echavarri et al. | |
| 2002/0065047 A1 | 5/2002 | Moose | |
| 2003/0076165 A1* | 4/2003 | Furman et al. | 329/304 |
| 2003/0161411 A1* | 8/2003 | McCorkle et al. | 375/295 |
| 2003/0198308 A1 | 10/2003 | Hoctor et al. | |
| 2003/0224741 A1 | 12/2003 | Sugar et al. | |
| 2004/0156445 A1* | 8/2004 | McCorkle | 375/295 |
| 2005/0220228 A1 | 10/2005 | Trachewsky et al. | |
| 2006/0193372 A1* | 8/2006 | McCorkle et al. | 375/130 |
| 2006/0221918 A1 | 10/2006 | Wang | |
| 2006/0233288 A1 | 10/2006 | Gruijters et al. | |
| 2006/0250891 A1* | 11/2006 | Krohn | 367/38 |
| 2008/0247486 A1* | 10/2008 | McCorkle | 375/295 |

FOREIGN PATENT DOCUMENTS

| | | |
|---|---|---|
| EP | 0266962 B1 | 5/1988 |
| EP | 0602520 A2 | 12/1993 |
| EP | 0602520 A2 | 6/1994 |
| JP | 2003018116 A | 1/2003 |
| WO | 03036819 A2 | 5/2003 |

OTHER PUBLICATIONS

Tian, "Weighted energy detection of ultra- wideband signals," in IEEE 6th Workshop on Signal Processing Advances in Wireless Communications, pp. 1068-1072, Jun. 2005.*

Kostylev, "Energy Detection of a Signal with Random Amplitude", IEEE International Conference on Communication, vol. 3, pp. 1606-1610, Apr. 2002.*

Gardner, "Signal Interception: A Unifying Theoretical Framework for Feature Detection", IEEE Trans. on Communication, vol. 36, No. 8. Aug. 1988.*

Mitola, "Cognitive radio for flexible mobile multimedia communications," in Proc. IEEE International Workshop on Mobile Multimedia Communication, Nov. 15, 1999.*

Graps. "An Introduction to Wavelets." IEEE Computational Science and Engineering. Jun. 1995: vol. 2, No. 2, p. 50-61.*

Soo-Young Chang, "Analysis of Proposed Sensing Schemes: IEEE 802.22-06/0032r0", Feb. 2006 this paper can be found in https://mentor.ieee.org/802.22/dcn/06/22-06-0032-00-0000-analysis-sensing-schemes.ppt and discloses different techniques including MRSS of the present application.*

Blazquez-Fernandez, "Design of synchronization subsystem for and Ultra Wideband Radio" MIT May 2003, this paper can be found in http://dspace.mit.edu/bitstream/handle/1721.1/38447/53225744.pdf?sequence=1discloses the use of coarse and fine technologies.*

Hur, "A wideband analog multi-resolution spectrum sensing (MRSS) technique for cognitive radio (CR) systems", Proceedings, 2006 IEEE International Symposium on Circuits and Systems, 2006, ISCAS 2006.*

Hur, "WLC05-1: A Cognitive Radio (CR) System Employing A Dual-Stage Spectrum Sensing Technique : A Multi-Resolution Spectrum Sensing (MRSS) and A Temporal Signature Detection (TSD) Technique", Global Telecommunications Conference, 2006, GLOBECOM '06, IEEE Nov. 27, 2006-Dec. 1, 2006 pp. 1-5.*

Hur, "A Cognitive Radio (CR) Testbed System Employing a Wideband Multi-Resolution Spectrum Sensing (MRSS) Technique", 2006 IEEE 64th Vehicular Technology Conference, 2006, VTC-2006 Fall, Sep. 25-28, 2006 pp. 1-5.*

Park, "Implementation Issues of A Wideband Multi-Resolution Spectrum Sensing (MRSS) Technique for Cognitive Radio (CR) Systems", 1st International Conference on Cognitive Radio Oriented Wireless Networks and Communications, 2006, Jun. 8-10, 2006 pp. 1-5.*

Park, "Analog integrator and analog-to-digital converter effect on a Multi-Resolution Spectrum Sensing (MRSS) for cognitive radio systems", Microwave Conference, 2006, APMC 2006, Asia-Pacific Dec. 12-15, 2006 pp. 971-974.*

D. Cabric, et al, Implementation Issues in Spectrum Sensing for Cognitive Radios, Berkeley Wireless Research Center, University of California, Berkeley, IEEE, 2004, pp. 772-776.

S. Haykin, Cognitive Radio: Brain-Empowered Wireless Communications, IEEE Journal on Selected Areas in Communications, vol. 23, No. 2, Feb. 2005, pp. 201-220.

Types of Radio Emissions, Wikipedia, Dec. 19, 2006, http://en.wikipedia.org/wiki/Types_of_radio_emissions.

Bryan Ackland, et al, High Performance Cognitive Radio Platform with Integrated Physical and Network Layer Capabilities, Interim Technical Report, Jul. 2005, pp. 1-13, Rutgers University.

Joy Laskar, et al., Reconfiguarable RFICs and Modules for Cognitive Radio, pp. 283-286, SiRF 2006.

Tian, Z., A Wavelet Approach to Wideband Spectrum Sensing for Cognitive Radios, 2006. <URL:www.ece.mtu.edu/faculty/ztian/papers/crowncom06_wavelet.pdf>.

French Search Report dated Sep. 17, 2007.

Danijela Cabric, et al., "Implementation Issues in Spectrum Sensing for Cognitive Radios." IEEE Xplore. Downloaded Mar. 25, 2009. 772-776.

Olivier Rioul and Pierre Duhamel. "Fast Algorithms for Discrete and Continuous Wavelet Transforms." IEEE Transactions on Information Theory. vol. 38, No. 2. Mar. 1992. 569-586.

Mokhtar Nibouche, et al., "Design and Implementation of a Wavelet Based System." IEEE Xplore. Downloaded Mar. 25, 2009. 463-466.

Office Action issued on Mar. 25, 2009 for German Patent Application No. 10 2006 048 541.6.

Non-Final Office Action for U.S. Appl. No. 11/458,249 mailed on Jul. 6, 2009.

Non-Final Office Action for U.S. Appl. No. 11/458,280 mailed on Jun. 17, 2009.

Danijela Cabric, et al., "Implementation Issues in Spectrum Sensing for Cognitive Radios." IEEE Xplore. 772-776, IEEE, 2004.

Kostylev, "Energy Detection of a Signal with Random Amplitude." IEEE International Conference on Communication. vol. 3, Apr. 2002. 1606-1610.

Salem, "New Multiple Access Frame Differential DS-UWB System." 2nd International Conference on Broadband Networks, BroadNets 2005, 7-7. vol. 2, Oct. 2005. 1163-1167.

Gardner, "Signal Interception: A Unifying Theoretical Framework for Feature Detection." IEEE Trans. on Communication. vol. 36, No. 8, Aug. 1988.

Mitola, "Cognitive Radio for Flexible Mobile Multimedia Communications." Proc. IEEE International Workshop on Mobile Multimedia Communication. Nov. 15, 1999.

Yoon, "Power Measurement Using the Wavelet Transform." IEEE Transactions on Instrumentation and Measurement. vol. 47, Issue 5, Oct. 1998. 1205-1210.

Graps, "An Introduction to Wavelets." IEEE Computational Science and Engineering. vol. 2, No. 2, Jun. 1995. 50-61.

* cited by examiner

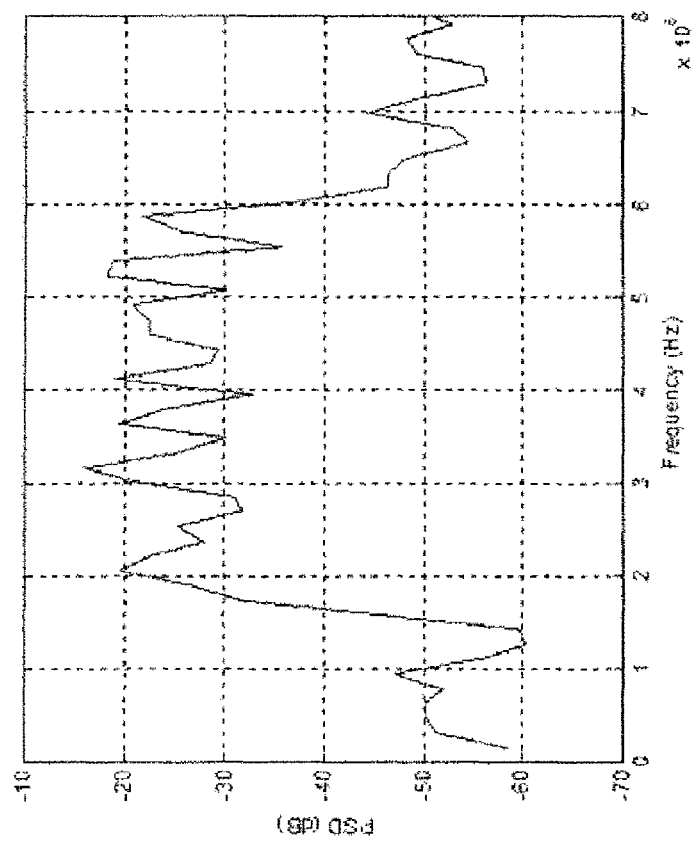
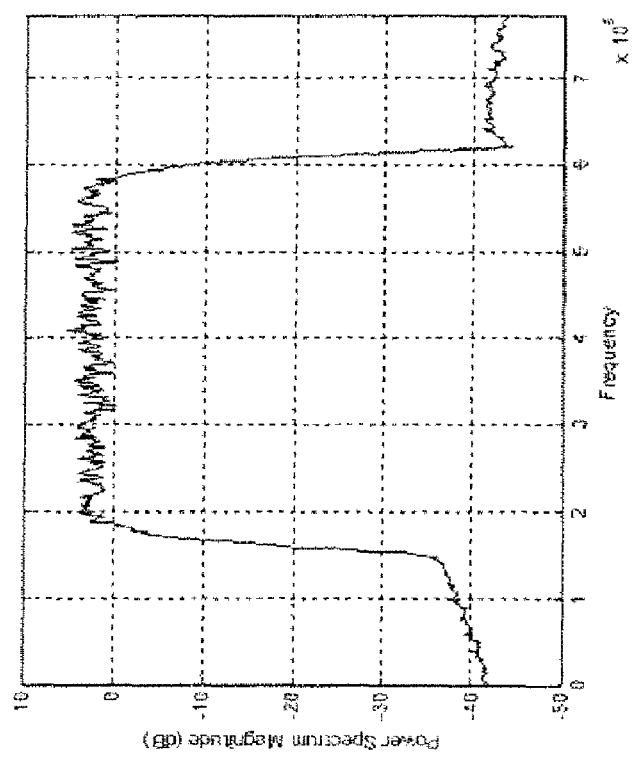
FIG. 16B
FIG. 16A

SYSTEMS, METHODS, AND APPARATUSES FOR COARSE SPECTRUM-SENSING MODULES

CROSS REFERENCE TO ELATED APPLICATIONS

This application claims priority to U.S. Provisional Application No. 60/729,037, filed Oct. 21, 2005, entitled "Systems, Methods, and Apparatuses for Coarse-Sensing Modules," which is incorporated herein by reference in its entirety. In addition, this application is related to the following co-pending, commonly assigned U.S. applications, each of which is entirely incorporated herein by reference: "Systems, Methods, and Apparatuses for Spectrum-Sensing Cognitive Radios" filed Jul. 18, 2006, and accorded application Ser. No. 11/458,249 and "Systems., Methods, and Apparatuses for Fine-Sensing Modules," filed Jul. 18, 2006, and accorded application Ser. No. 11/458,280.

FIELD OF THE INVENTION

The present invention relates generally to wireless communications, and more particularly to systems, methods, and apparatuses for determining radio frequency (RF) spectrum usage.

BACKGROUND OF THE INVENTION

In the United States and in a number of other countries, a regulatory body like the FCC (Federal Communications Commission) oftentimes regulates and allocates the use of radio spectrum in order to fulfill the communications needs of entities such as businesses and local and state governments as well as individuals. More specifically, the FCC licenses a number of spectrum segments to entities and individuals for commercial or public use ("licensees"). These licensees may have an exclusive right to utilize their respective licensed spectrum segments for a particular geographical area for a certain amount of time. Such licensed spectrum segments are believed to be necessary in order to prevent or mitigate interference from other sources. However, if particular spectrum segments are not in use at a particular location at a particular time ("the available spectrum"), another device should be able to utilize such an available spectrum for communications. Such utilization of the available spectrum would make for a much more efficient use of the radio spectrum or portions thereof.

Previous spectrum-sensing techniques disclosed for determining the available spectrum have been met with resistance for at least two reasons: (1) they either do not work for sophisticated signal formats or (2) they require excessive hardware performances and/or computation power consumption. For example, a spectrum sensing technique has been disclosed where a non-coherent energy detector performs a computation of a Fast Fourier Transform (FFT) for a narrow-band input signal. The FFT provides the spectral components of the narrow-band input signal, which are then compared with a predetermined threshold level to detect a meaningful signal reception. However, this predetermined threshold level is highly-affected by unknown and varying noise levels. Moreover, the energy detector does not differentiate between modulated signals, noise, and interference signals. Thus, it does not work for sophisticated signal formats such as spread spectrum signal, frequency hopping, and multi-carrier modulation.

As another example, a cyclo-stationary feature detection technique has been disclosed as a spectrum-sensing technique that exploits the cyclic features of modulated signals, sinusoid carriers, periodic pulse trains, repetitive hopping patterns, cyclic prefixes, and the like. Spectrum correlation functions are calculated to detect the signal's unique features such as modulation types, symbol rates, and presence of interferers. Since the detection span and frequency resolution are trade-offs, the digital system upgrade is the only way to improve the detection resolution for the wideband input signal spectrum. However, such a digital system upgrade requires excessive hardware performances and computation power consumption. Further, flexible or scalable detection resolution is not available without any hardware changes.

Accordingly, there is a need in the industry for coarse-sensing modules that allow for the determination of spectrum usage while minimizing hardware and power consumption requirements.

SUMMARY OF THE INVENTION

According to an embodiment of the present invention, there is a coarse-sensing module that is operative for examining radio frequency (RF) inputs for possible interferers. Accordingly, the coarse-sensing modules may provide for initial determinations of spectrum occupancy. For example, the coarse-sensing modules may detect spectrum occupancy associated with communications via a variety of current and emerging wireless standards including IS-95, WCDMA, EDGF, GSM, Wi-Fi, Wi-MAX, Zigbee, Bluetooth, digital TV (ATSC, DVB), and the like.

The coarse-sensing modules may be incorporated as part of cognitive radios, although other embodiments may utilize the coarse-sensing modules in other wireless devices and systems. As described herein, the coarse-sensing modules may implement a multi-resolution sensing feature known as Multi-Resolution Spectrum Sensing (MRSS), although other alternatives may be utilized as well.

According to an embodiment of the present invention, there is a radio frequency (RF) spectrum-sensing system. The system includes a wavelet waveform generator providing a plurality of wavelet pulses, a multiplier that combines the wavelet pulses with an input signal to form a correlation signal, an integrator that receives the generated correlation signal, wherein the integrator determines correlation values from integrating the correlation signal, and a spectrum recognition module in communication with the integrator that determines an available spectrum segment based at least in part on the correlation values.

According to an aspect of the present invention, the plurality of wavelet pulses may be modulated. The modulated wavelet pulses may be formed of a sinusoidal carrier signal and an envelope signal, where the envelope signal determines at least in part, a width and shape of the wavelet pulse. According to another aspect of the present invention, at least one of a carrier frequency, width, and shape associated with the wavelet pulses may be reconfigurable. In addition, an amplifier that amplifies the input signal further comprises a driver amplifier. According to still another aspect of the present invention, the correlation values are digitized. According to yet another aspect of the present invention, the spectrum recognition module determines the available spectrum based at least in part on a spectrum usage database, wherein the spectrum usage database includes information associated with one or more known signal types.

According to another embodiment of the present invention, there is a method of determining radio frequency (RF) spectrum usage. The method includes generating a plurality of wavelet pulses, combining the wavelet pulses with an input signal to form a correlation signal, calculating correlation values by integrating the correlation signal, and determining an available spectrum segment based at least in part on the correlation values.

According to an aspect of the present invention, generating a plurality of wavelet pulses may include a plurality of Gaussian wavelet pulses chosen from at least one of Gaussian wavelet pulses and Hanning wavelet pulses. According to another aspect of the present invention, generating a plurality of wavelet pulses may include generating a plurality of modulated wavelet pulses, where the plurality of modulated wavelet pulses include a sinusoidal carrier signal and an envelope signal. According to another aspect of the present invention, the envelope signal determines at least in part, a width and shape of the wavelet pulse. In addition, the method may further include reconfiguring at least one of a carrier frequency, width, and shape associated with the wavelet pulses. According to another aspect of the present invention. combining the wavelet pulses with an input signal may include multiplying the wavelet pulse with the input signal. According to another aspect of the present invention, combining the wavelet pulses with an input signal may include combining the wavelet pulse with the input signal amplified by a driver amplifier.

According to yet another aspect of the present invention, the method may further include digitizing the correlation values, where determining the available spectrum may include determining the available spectrum segment based at least in part on the digitized correlation values. According to another aspect of the present invention, determining an available spectrum segment may include determining the available spectrum based at least in part on the correlation values and a spectrum usage database, where the spectrum usage database includes information associated with one or more known signal types. The spectrum usage database may be updated based upon information transmitted from a remote station.

According to yet another embodiment of the present invention, there is a radio frequency (RF) spectrum-sensing apparatus. The apparatus includes an antenna for receiving input signals, a wavelet generator that provides a plurality of wavelet pulses, a multiplier for combining the received input signals and the wavelet pulses to form a correlation signal, and an integrator that integrates the correlation signal to retrieve correlation values.

According to an aspect of the present invention, the wavelet generator may include a local oscillator and a generator for envelope signals, wherein the envelope signals may determine a width and shape of the wavelet pulses. According to another aspect of the present invention, the wavelet generator may be operative to form I-Q modulated wavelet pulses. According to yet another aspect of the present invention, the correlation values above one or more thresholds may be operative to provide an indication of spectrum occupancy.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 12-17 illustrate simulations of various signal formats detected by MRSS implementations in accordance with embodiments of the present invention.

DETAILED DESCRIPTION OF THE INVENTION

The present invention now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Embodiments of the present invention relate to cognitive radio systems, methods, and apparatuses for exploiting limited spectrum resources. The cognitive radios may allow for negotiated and/or opportunistic spectrum sharing over a wide frequency range covering a plurality of mobile communication protocols and standards. In accordance with the present invention, embodiments of the cognitive radio may be able to intelligently detect the usage of a segment in the radio spectrum and to utilize any temporarily unused spectrum segment rapidly without interfering with communications between other authorized users. The use of these cognitive radios may allow for a variety of heterogeneous wireless networks (e.g., using different communication protocols, frequencies, etc.) to coexist with each other. These wireless networks may include cellular networks, wireless personal area networks (PAN), wireless local area networks (LAN), and wireless metro area networks (MAN). These wireless networks may also coexist with television networks, including digital TV networks. Other types of networks may be utilized in accordance with the present invention, as known to one of ordinary skill in the art.

A. System Overview of Cognitive Radios

Figure 1:
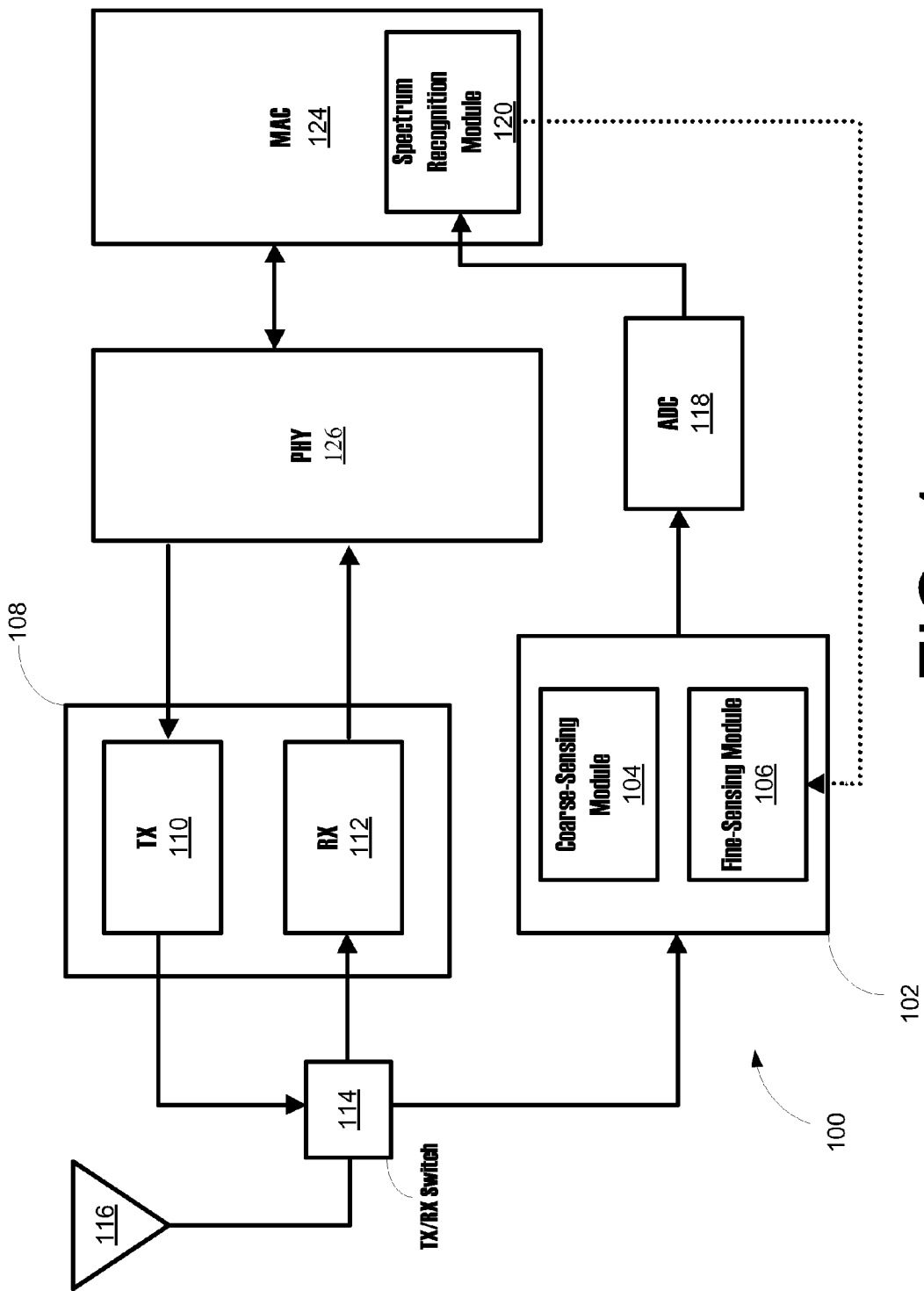
FIG. 1 illustrates a functional block diagram of an exemplary cognitive radio system in accordance with an embodiment of the present invention.

FIG. 1 illustrates a functional block diagram of an exemplary cognitive radio system in accordance with an embodiment of the present invention. In particular, FIG. 1 illustrates a cognitive radio 100 that includes an antenna 116, a transmit/receive switch 114, a radio front end 108, an analog wideband spectrum-sensing module 102, an analog to digital converter 118, a signal processing module 126, and a medium access control (MAC) module 124.

During operation of the cognitive radio system of FIG. 1, which will be discussed in conjunction with the flowchart of FIG. 2, radio frequency (RF) input signals may be received by the antenna 116. In an exemplary embodiment of the present invention, the antenna 116 may be a wideband antenna operable over a wide frequency range, perhaps from several megahertz (MHz) to the multi-gigahertz (GHz) range. The input signals received by the antenna 116 may be passed or otherwise provided to the analog wideband spectrum-sensing module 102 via the transmit/receive switch 114 (block 202). The spectrum-sensing module 102 may include one or both of a coarse-sensing module 104 and a fine-sensing module 106. As their names suggest, the coarse-sensing module 104 may detect the existence or presence of suspicious spectrum segments (e.g. potentially utilized spectrum segments) while the fine-sensing module 106 may scrutinize or otherwise analyze the detected suspicious spectrum segments to determine the particular signal types and/or modulation schemes utilized therein.

Referring back to FIG. 2, the coarse-sensing module 104 may initially determine the spectrum occupancy for the received input signal (block 204). The spectrum occupancy information may be converted from analog form to digital form by the analog-to-digital (A/D) converter 118, which may be a low-speed A/D converter (ADC) in an exemplary embodiment of the present invention. The digital spectrum occupancy information provided by the A/D converter 118 may be received by the spectrum recognition module 120 in the medium access control (MAC) module 124. The spectrum recognition module 120 may perform one or more calculations on the digital spectrum occupancy information to recognize whether one or more spectrum segments are currently in use or occupied by others. The spectrum recognition module 120 may be implemented in hardware, software, or a combination thereof.

In some instances, based on the recognized spectrum segments, the MAC module 124 may request a more refined search of the spectrum occupancy (block 206). In such a case, the fine-sensing module 106 may be operative to identify the particular signal types and/or modulation schemes utilized within at least a portion of the spectrum occupancy (block 208). The information identifying the signal types and/or modulation schemes may then be digitized by the A/D converter 118, and provided to the spectrum recognition module 120. Information about the signal type and/or modulation scheme may be necessary to determine the impact of interferers within the detected suspicious spectrum segments.

In accordance with an embodiment of the present invention, the spectrum recognition module 120 may compare information from the coarse-sensing module 104 and/or fine-sensing module 106 with a spectrum usage database (block 210) to determine an available (e.g., non-occupied or safe) spectrum slot (block 212). The spectrum usage database may include information regarding known signal types, modulation schemes, and associated frequencies. Likewise, the spectrum usage database may include one or more thresholds for determining whether information from the coarse-sensing module 104 and/or fine-sensing module 106 is indicative of one or more occupied spectrum. According to an exemplary embodiment of the present invention, the spectrum usage database may be updated based upon information received from an external source, including periodic broadcasts form a base station or other remote station, removable information stores (e.g., removable chips, memory, etc.). Internet repositories. Alternatively, the spectrum usage database may be updated based upon internally, perhaps based upon adaptive learning techniques that may involve trial and error, test configurations, statistical calculations, etc.

The sensing results determined by the spectrum recognition module 120 may be reported to the controller (e.g., spectrum allocation module) of the MAC module 124, and permission may be requested for a particular spectrum use (block 214). Upon approval from the controller (block 216), the reconfiguration block of the MAC module 124 may provide reconfiguration information to the radio front end 108 via the signal processing module 126 (block 218). In an exemplary embodiment of the present invention, the radio front-end 108 may be reconfigurable to operate at different frequencies ("frequency-agile"), where the particular frequency or frequencies may depend upon the selected spectrum segments for use in communications by the cognitive radio 100. In conjunction with the frequency-agile front-end 108, the signal processing module 126, which may be a physical layer signal processing block in an exemplary embodiment, may enhance the cognitive radio's 100 performance with adaptive modulation and interference mitigation technique.

Many modifications can be made to the cognitive radio 100 without departing from embodiments of the present invention. In an alternative embodiment, the antenna 116 may comprise at least two antennas. A first antenna may be provided for the radio front end 108 while a second antenna may be provided for the spectrum sensing module 102. The use of at least two antennas may remove the necessity of a transmit/receive switch 114 between the radio front end 108 and the spectrum-sensing module 102 according to an exemplary embodiment. However, in another embodiment of the present invention, a transmit/receive switch 114 may still be needed between the transmitter 110 and the receiver 112 of the radio front end 108. In addition, the spectrum sensing module 102, the A/D converter 118, and the MAC module 124 may remain in operation even where the radio front end 108 and signal processing module 126 are not operational or are on standby. This may reduce the power consumption of the cognitive radio 100 while still allowing the cognitive radio 100 to determine the spectrum occupancy.

Having described the cognitive radio 100 generally, the operation of the components of the cognitive radio 100 will now be described in further detail.

B. Spectrum-sensing Components

Still referring to FIG. 1, the spectrum-sensing module 102 may include the coarse-sensing module 104 and a fine-sensing module 106, according to an exemplary embodiment of the present invention. However, other embodiments of the present invention may utilize only one of the spectrum-sensing module 102 or the coarse-sensing module 104 as necessary. In addition, while the spectrum-sensing module 102 has been illustrated as a component of an exemplary cognitive radio 100, such a spectrum-sensing module 102 may be embodied in a different device and utilized as an efficient method for determining the available spectrum in alternative applications. These alternative applications may include wireless personal area networks (PANs), wireless local area networks (LANs), wireless telephones, cellular phones, digital televisions, mobile televisions, and global positioning systems.

Now referring to the spectrum-sensing module 102 of FIG. 1, spectrum-sensing module 102 may include the coarse the coarse-sensing module 104 and the fine-sensing module 106, which may be utilized together to enhance the accuracy of the spectrum detection performance by the MAC module 124. In addition, according to an embodiment of the present invention, the spectrum-sensing module 102 may be implemented in an analog domain, which may offer several features. For example, such a spectrum-sensing module 102 implemented in the analog domain may provide for fast detection for a wideband frequency range, low power consumption, and low hardware complexity. The coarse-sensing module 104 and the fine-sensing module 106 of the spectrum-sensing module 102 will now be discussed in further detail below.

1. Coarse-sensing module

In accordance with an exemplary embodiment of the present invention, the coarse-sensing module 104 may utilize wavelet transforms in providing a multi-resolution sensing feature known as Multi-Resolution Spectrum Sensing (MRSS). The use of MRSS with the coarse-sensing module 104 may allow for a flexible detection resolution without requiring an increase in the hardware burden.

With MRSS, a wavelet transform may be applied to a given time-variant signal to determine the correlation between the given time-variant signal and the function that serves as the basis (e.g., a wavelet pulse) for the wavelet transform. This determined correlation may be known as the wavelet transform coefficient, which may be determined in analog form according to an embodiment of the present invention. The wavelet pulse described above that serves as the basis for the wavelet transform utilized with MRSS may be varied or configured, perhaps via the MAC module 124, according to an embodiment of the present invention. In particular, the wavelet pulses for the wavelet transform may be varied in bandwidth, carrier frequency, and/or period. By varying the wavelet pulse width, carrier frequency, and/or period, the spectral contents provided through the wavelet transform coefficient for the given signal may be represented with a scalable resolution or multi-resolution. For example, by varying the wavelet pulse width and/or carrier frequency after maintaining them within a certain interval, the wavelet transform coefficient may provide an analysis of the spectral contents of the time-variant signals in accordance with an exemplary embodiment of the present invention. Likewise, the shape of the wavelet pulse may be configurable according to an exemplary embodiment of the present invention.

a. Wavelet Pulse Selection

Figure 3:
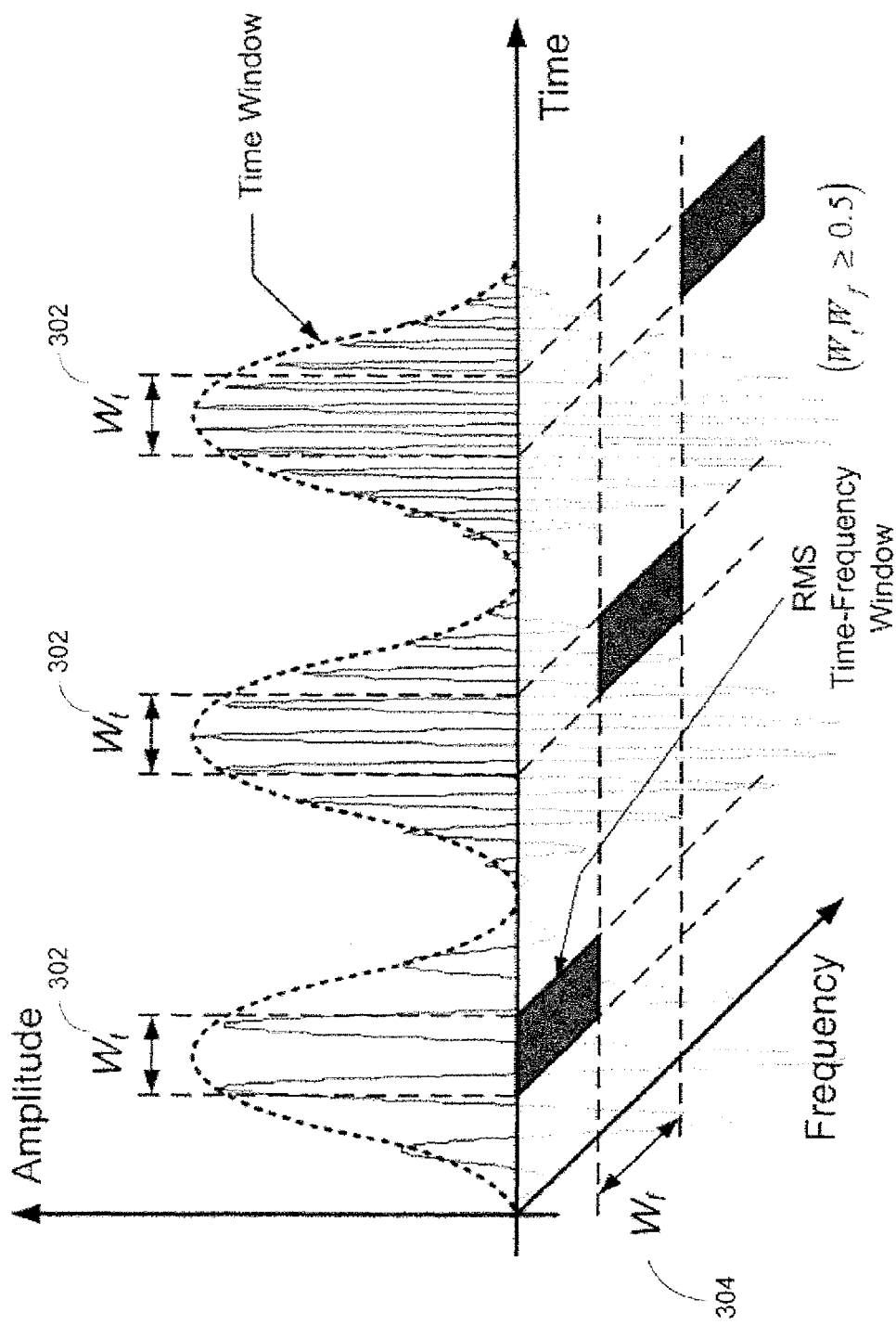
FIG. 3 illustrates a tradeoff between a wavelet pulse width and a wavelet pulse frequency in accordance with an embodiment of the present invention.

The selection of the appropriate wavelet pulse, and in particular the width and carrier frequency for the wavelet pulse, for use in MRSS will now be described in further detail. FIG. 3 illustrates the tradeoff between the wavelet pulse width (Wt) 302 and the wavelet pulse frequency (Wf) 304 (e.g., also referred herein as the "resolution bandwidth") that may be considered when selecting an appropriate wavelet pulse. In other words, as the wavelet pulse width 302 increases, the wavelet pulse frequency 304 generally decreases. As shown in FIG. 3, the wavelet pulse width 302 may be inversely proportional to the wavelet pulse frequency 304.

In accordance with an embodiment of the present invention, an uncertainty inequality may be applied to the selection of a wavelet pulse width (Wt) 302 and resolution bandwidth (Wf) 304. Generally, the uncertainty inequality provides bounds for the wavelet pulse width (Wt) 302 and resolution bandwidth (Wf 304 for particular types of wavelet pulses. An uncertainty inequality may be utilized where the product of the wavelet pulse width (Wt) 302 and the resolution bandwidth (Wf) 304 may be greater than or equal to 0.5 (i.e., Wt*Wf≧0.5). Equality may be reached where the wavelet pulse is a Gaussian wavelet pulse. Thus, for a Gaussian wavelet pulse, the wavelet pulse width (Wt) 302 and the resolution bandwidth (Wf) 304 may be selected for use in the wavelet transform such that their product is equal to 0.5 according to the uncertainty inequality.

While the Gaussian wavelet pulses have been described above for an illustrative embodiment, other shapes of wavelet pulses may be utilized, including from the Hanning, Haar, Daubechies. Symlets, Coifets, Bior Splines, Reverse Bior, Meyer, DMeyer, Mexican hat, Morlet, Complex Gaussian, Shannon, Frequency B-Spline, and Complex Morlet wavelet families.

b. Block Diagram for MRSS Implementation

Figure 4A:
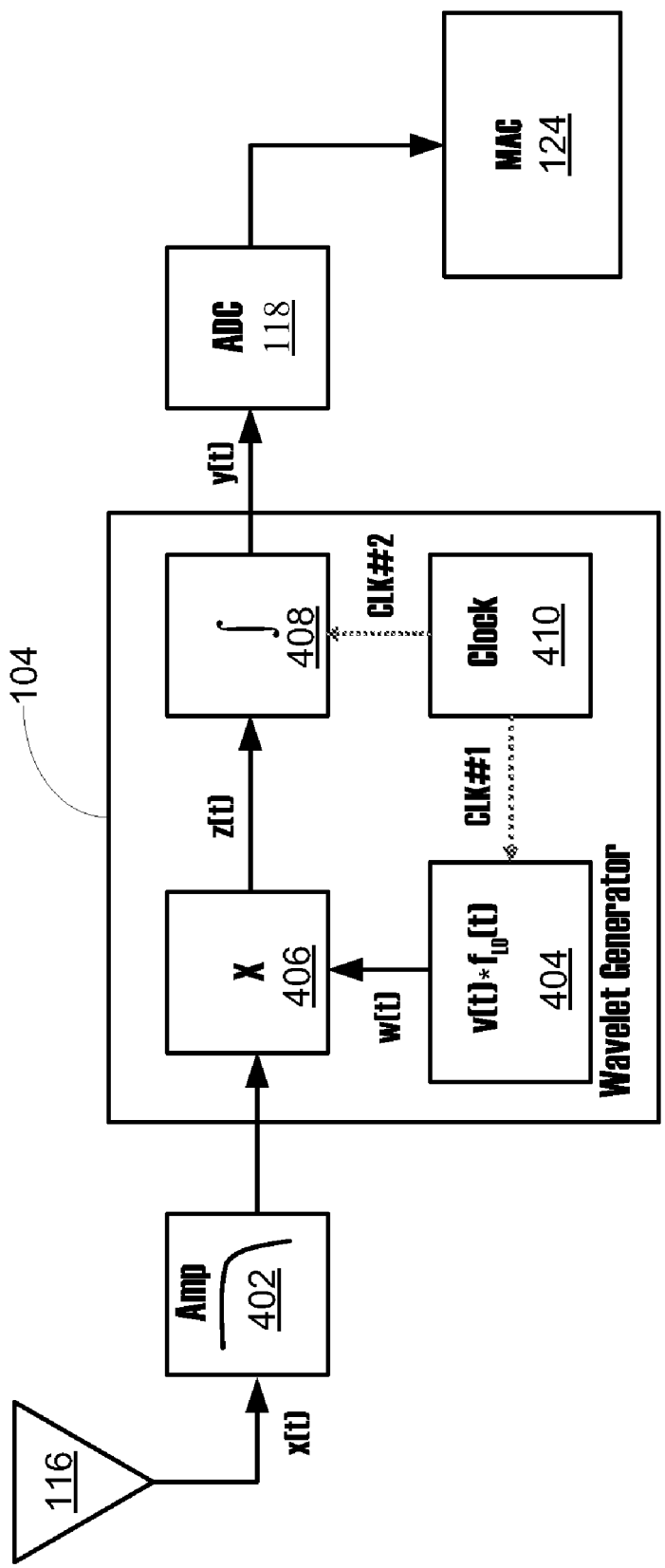
FIG. 4A illustrates a block diagram for an exemplary Multi-Resolution Spectrum Sensing (MRSS) implementation in accordance with an embodiment of the present invention.

FIG. 4A illustrates a block diagram for an exemplary Multi-Resolution Spectrum Sensing (MRSS) implementation that includes a coarse-sensing module 104. In particular, the coarse-sensing module may receive a time-variant RF input signal x(t) from the antenna 116. According to an exemplary embodiment of the present invention, this RF input signal x(t) may be amplified by an amplifier 402 before being provided to the coarse sensing module 104. For example, the amplifier 402 may be a driver amplifier, which may be operative to provide for consistent gain across a wide frequency range.

Referring to the coarse-sensing module 104 of FIG. 4A, the coarse-sensing module 104 may be comprised of an analog wavelet waveform generator 404, an analog multiplier 406, an analog integrator 408, and a timing clock 410. The timing clock 410 may provide timing signals utilized by the wavelet generator 404 and the analog integrator 408. Analog correlation values may be provided at the output of the analog integrator 408, which may in turn be provided to an analog-to-digital converter (ADC) 118, which may be low-speed according to an exemplary embodiment of the present invention. The digitized correlation values at the output of the ADC 118 may be provided to the medium access control (MAC) module 124.

Still referring to FIG. 4A, the wavelet generator 404 of the coarse-sensing module 104 may be operative to generate a chain of wavelet pulses v(t) that are modulated to form a chain of modulated wavelet pulses w(t). For example, the chain of wavelet pulses v(t) may be modulated with I- and Q-sinusoidal carriers $f_{LO}(t)$, having a given local oscillator (LO) frequency. With the I- and Q-sinusoidal carriers $f_{LO}(t)$, the I-component signal may be equal in magnitude but 90 degrees out of phase with the Q-component signal. The chain of modulated wavelet pulses w(t) output by the wavelet generator 404 may then be multiplied or otherwise combined with the time-variant input signal x(t) by the analog multiplier 406 to form an analog correlation output signal z(t) that is input into the analog integrator 408. The analog integrator 408 determines and outputs the analog correlation values y(t).

These analog correlation values y(t) at the output of the analog integrator 408 are associated with wavelet pulses v(t) having a given spectral width that is based upon the pulse width and the resolution bandwidth discussed above. Referring back to the coarse-sensing module 104 of FIG. 4A, the wavelet pulse v(t) is modulated using the I- and Q-sinusoidal carriers $f_{LO}(t)$ to form the modulated wavelet pulses w(t). The local oscillator (LO) frequency of the I- and Q-sinusoidal carriers $f_{LO}(t)$ can then be swept or adjusted. By sweeping the I- and Q-sinusoidal carriers $f_{LO}(t)$, the signal power magnitudes and the frequency values within the time-variant input signal x(t) may be detected in the analog correlation values y(t) over a spectrum range, and in particular over the spectrum range of interest, thereby providing for scalable resolution.

Figure 4B:
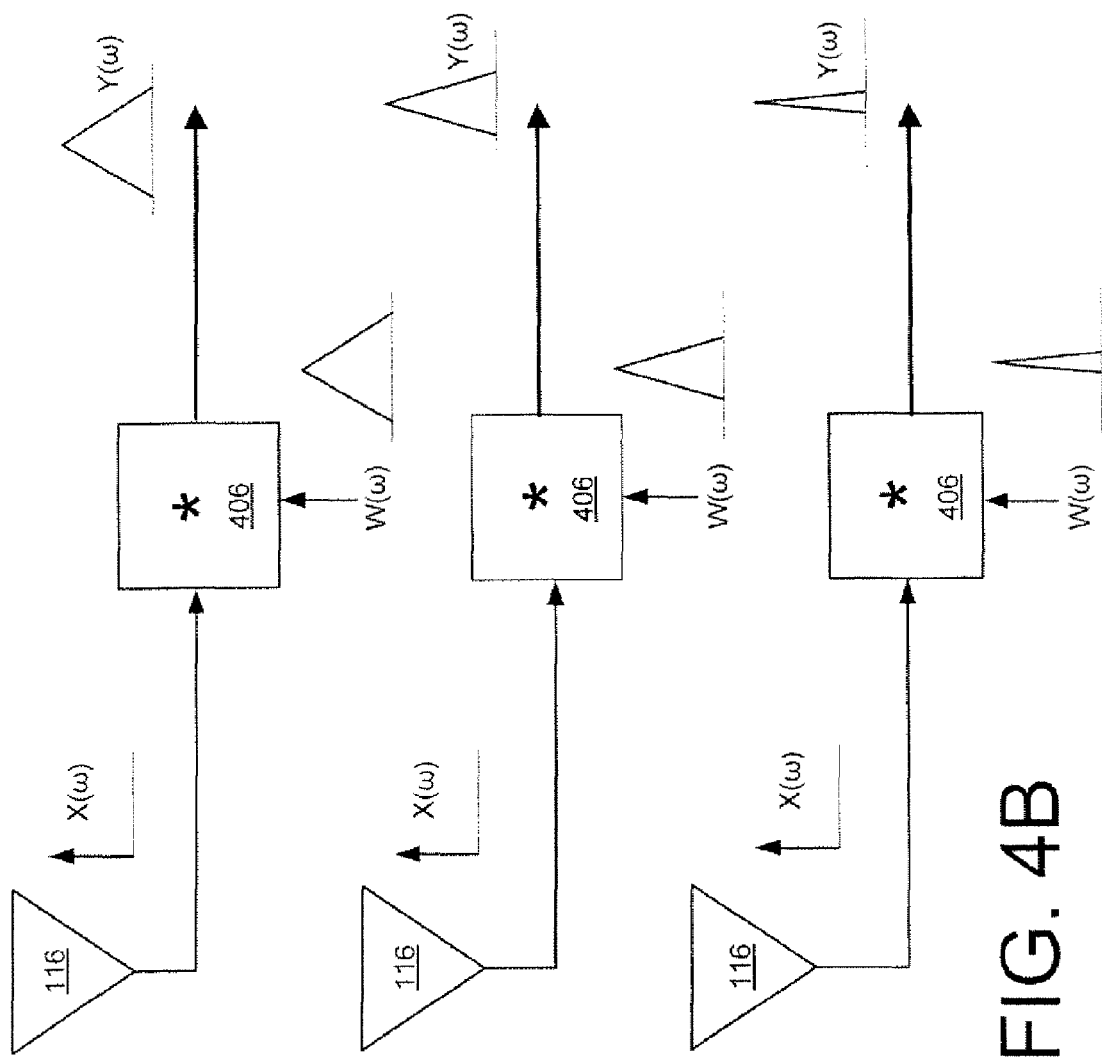
FIG. 4B illustrates an example of scalable resolution control in accordance with an embodiment of the present invention.

For example, by applying a narrow wavelet pulse v(t) and a large tuning step size of the LO frequency $f_{LO}(t)$, an MRSS implementation in accordance with an embodiment of the present invention may examine a very wide spectrum span in a fast and sparse manner. By contrast, very precise spectrum searching may be realized with a wide wavelet pulse v(t) and the delicate adjusting of the LO frequency $f_{LO}(t)$. Moreover, in accordance with an exemplary embodiment of the present invention, this MRSS implementation may not require any passive filters for image rejection due to the bandpass filtering effect of the window signal (e.g., modulated wavelet pulses w(t)). Likewise, the hardware burdens, including high-power consuming digital hardware burdens, of such an MRSS implementation may be minimized. FIG. 4B illustrates an example of such scalable resolution control in the frequency domain with the use of wavelet pulses W(ω). In particular, FIG. 4B illustrates that an input signal W(ω) can be multiplied 406 with wavelet pulse W(ω) having varying resolution bandwidths to achieve scalable resolution control of the various output correlation values Y(ω).

Referring back to FIG. 4A, once the analog correlation values y(t) have been generated by the analog integrator 408, the magnitudes of the coefficient values y(t) may be digitized by the analog-to-digital converter 118 and provided to the MAC module 124. More specifically, the resulting analog correlation values y(t) associated with each of the I- and Q-components of the wavelet waveforms may be digitized by the analog-to-digital converter 118, and their magnitudes are recorded by the MAC module 124. If the magnitudes are greater than a certain threshold level, then the sensing scheme, perhaps utilizing the spectrum recognition module 120 in the MAC module 124, may determine a meaningful interferer reception (e.g., a particular detected spectrum occupancy) in accordance with an embodiment of the present invention.

c. Simulation of MRSS Implementation

Figure 5B:
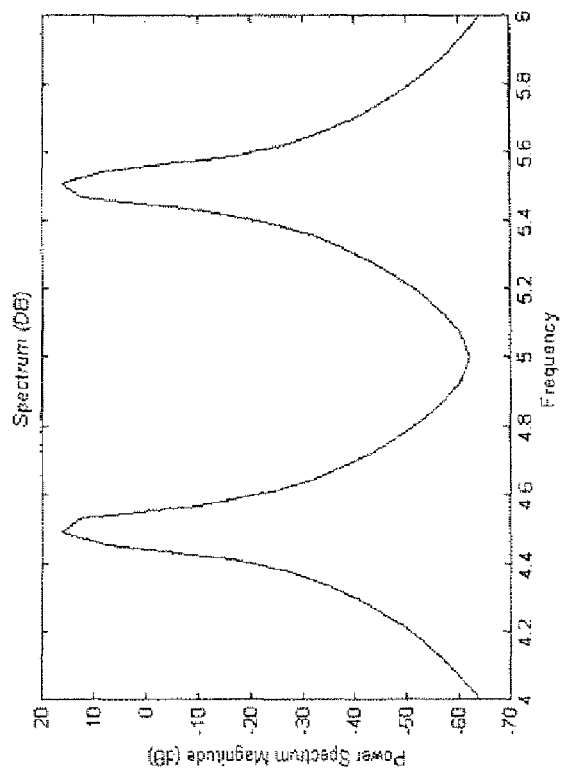
FIG. 5A illustrates the waveform of a two-tone signal and FIG. 5B illustrates the corresponding spectrum to be detected with the MRSS implementation in accordance with an embodiment of the present invention.
Figure 5A:
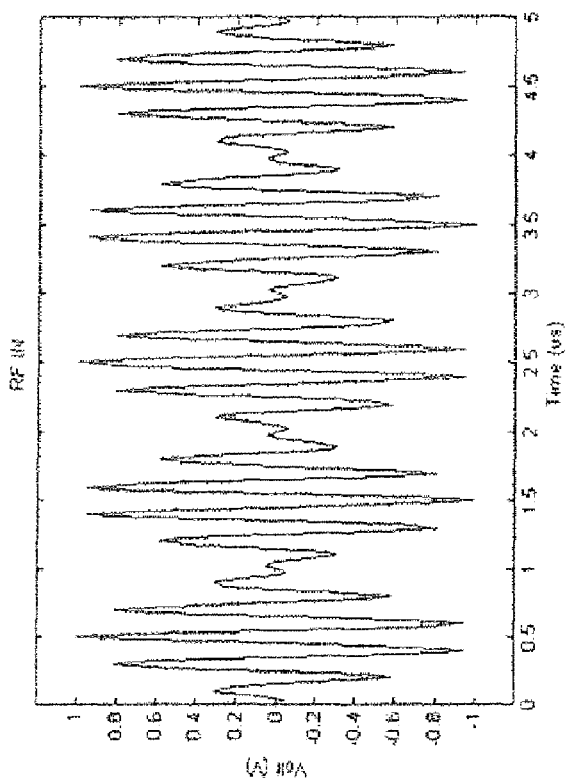

An Multi-Resolution Spectrum Sensing (MRSS) implementation in accordance with an embodiment of the present invention will now be described with respect to several computer simulations. In particular, a computer simulation was performed using a two-tone signal x(t), where each tone was set at the same amplitude but at a different frequency. The sum of the two tone signals with different frequencies and the phases can be expressed as $x(t)=A_1 \cos(\omega_1 t+\theta_1)+A_2 \cos(\omega_2 t+\theta_2)$. FIG. 5A illustrates the waveform of the two-tone signal. x(t), and FIG. 5B illustrates the corresponding spectrum to be detected with the MRSS implementation in accordance with an embodiment of the present invention.

In accordance with the exemplary simulated MRSS implementation, the Hanning window function (e.g., Wt*Wf=0.513) for this exemplary simulated MRSS implementation was chosen as the wavelet window function that bounds the selection of wavelet pulse width Wt and the resolution bandwidth Wf for the wavelet pulses v(t). The Hanning window function was used in this simulation because of its relative simplicity in terms of the practical implementation. The uncertainty inequality of Wt*Wf=0.513 discussed above may be derived from the calculations of the wavelet pulse width (Wt) 302 and the resolution bandwidth (Wf) 304 for Hanning wavelet pulses as shown below:

$$W_t^2 = \frac{1}{E} \int_{-\infty}^{\infty} t^2 v^2(t) dt$$

$$= \frac{1}{E} \int_{-\pi/\omega_p}^{\pi/\omega_p} t^2 [1+\cos(\omega_p t)]^2 dt$$

$$= \frac{2\pi^2 - 15}{6\omega_p^2}$$

$$W_f^2 = \frac{1}{2\pi E} \int_{-\infty}^{\infty} \omega^2 |V(j\omega)|^2 d\omega$$

$$= \frac{1}{2\pi E} \int_{-\infty}^{\infty} \omega^2 \left| \frac{\omega_p^2}{\omega(\omega_p^2 - \omega^2)} \sin\left(\frac{\omega\pi}{\omega_p}\right) \right|^2 d\omega$$

$$= \frac{\omega_p^2}{3}$$

Figure 6:
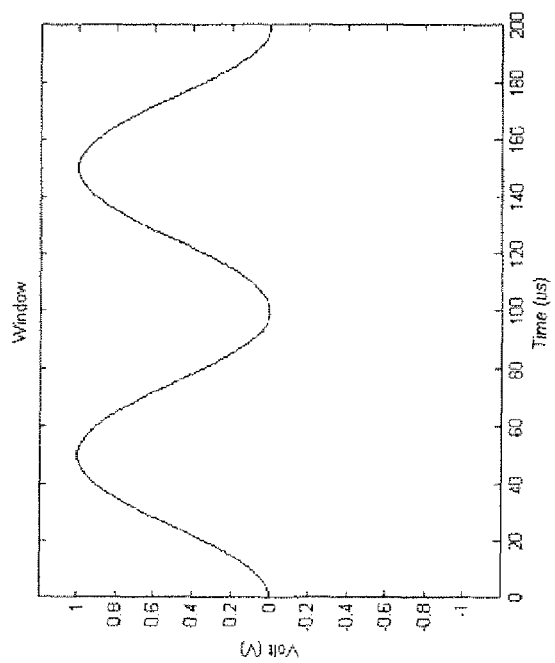
FIG. 6 illustrates a waveform of the chain of wavelet pulses in accordance with an embodiment of the present invention.

FIG. 6 illustrates the waveform of the exemplary chain of wavelet pulses v(t). Accordingly, a chain of modulated wavelet pulses w(t) may be obtained from the wavelet generator 404 by modulating the I- and Q-sinusoidal carriers $f_{LO}(t)$ with a window signal comprised of a chain of wavelet pulses v(t) in an exemplary embodiment of the present invention. In particular, the modulated wavelet pulses w(t) may be obtained by $w(t)=v(t)\cdot f_{LO}(t)$, where $v(t)=1+m\cos(\omega_p t+\theta_p)$ and $$f_{LO}(t) = \sum_{k=t}^{K} \cos(k\omega_{LO}t + \Phi), \Phi = 0 \text{ or } 90°.$$

Figure 7A:
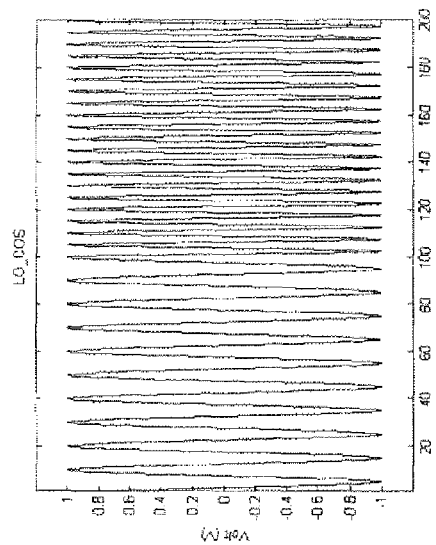
FIG. 7A illustrates the I-component waveform of the I-Q sinusoidal carrier.
Figure 7B:
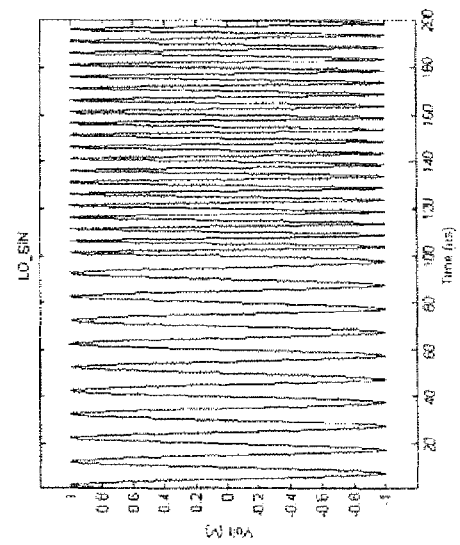
FIG. 7B illustrates the Q-component waveform of the I-Q sinusoidal carrier in accordance with an embodiment of the present invention.
Figure 8B:
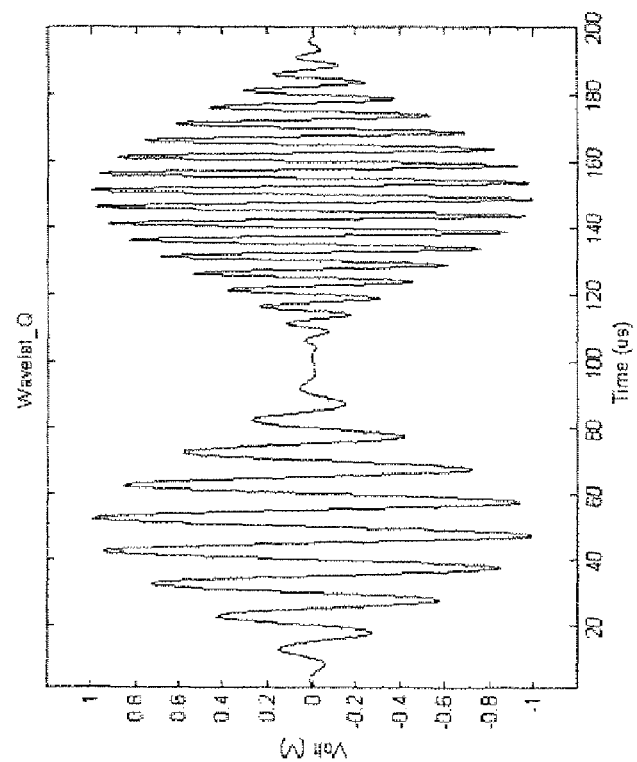
FIG. 8B illustrates the modulated wavelet pulses obtained from a wavelet generator with a Q-component of an I-Q sinusoidal carrier in accordance with an embodiment of the present invention.
Figure 8A:
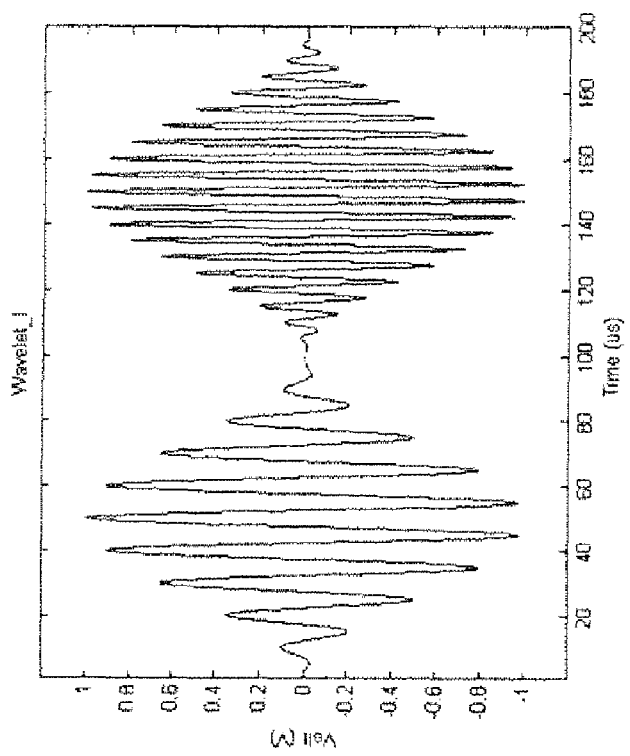
FIG. 8A illustrates modulated wavelet pulses obtained from a wavelet generator with an I-component of an I-Q sinusoidal carrier in accordance with an embodiment of the present invention.

FIG. 7A illustrates the I-component waveform of the I-Q sinusoidal carrier $f_{LO}(t)$, and FIG. 7B illustrates the Q-component waveform of the I-Q sinusoidal carrier $f_{LO}(t)$. FIG. 8A illustrates the modulated wavelet pulses w(t) obtained from the wavelet generator 404 with the I-component of the I-Q sinusoidal carrier $f_{LO}(t)$. Likewise, FIG. 8B illustrates the modulated wavelet pulses w(t) obtained from the wavelet generator 404 with the Q-component of the I-Q sinusoidal carrier $f_{LO}(t)$.

Figures 9A, 9B:
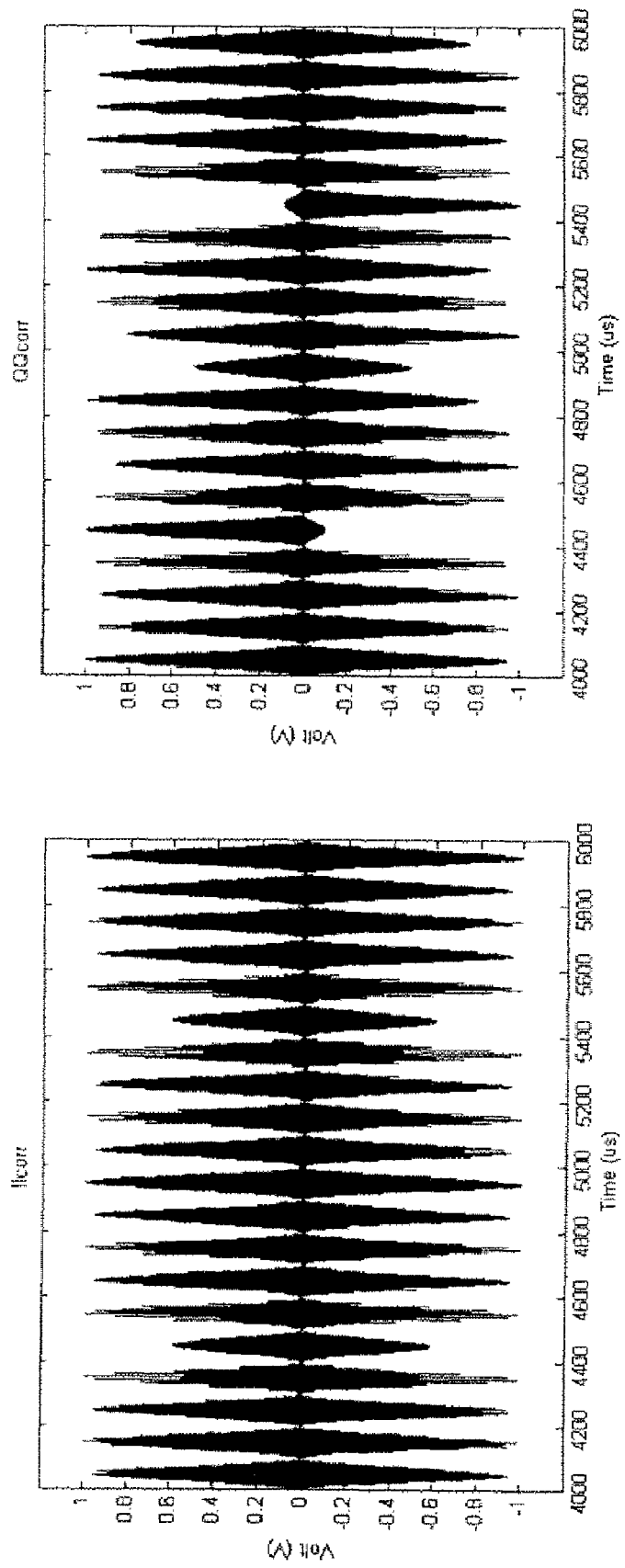
FIG. 9A illustrates a correlation output signal waveform for the input signal with the I-component of the I-Q sinusoidal carrier in accordance with an embodiment of the present invention
FIG. 9B illustrates the correlation output signal waveform for the input signal with the Q-component of the I-Q sinusoidal carrier in accordance with an embodiment of the present invention.

Each modulated wavelet pulse w(t) is then multiplied by the time-variant signal x(t) by an analog multiplier 406 to produce the resulting analog correlation output signals z(t), as illustrated in FIGS. 9A and 9B. In particular, FIG. 9A illustrates the correlation output signal z(t) waveform for the input signal x(t) with the I-component of the I-Q sinusoidal carrier $f_{LO}(t)$ while FIG. 9B illustrates the correlation output signal z(t) waveform for the input signal x(t) with the Q-component of the I-Q sinusoidal carrier $f_{LO}(t)$. The resulting waveforms in FIGS. 9A and 9B are then integrated by the analog integrator 408 to obtain the correlation values y(t) of the input signal x(t) with the I- and the Q-component of the wavelet waveform w(t).

Figure 10A:
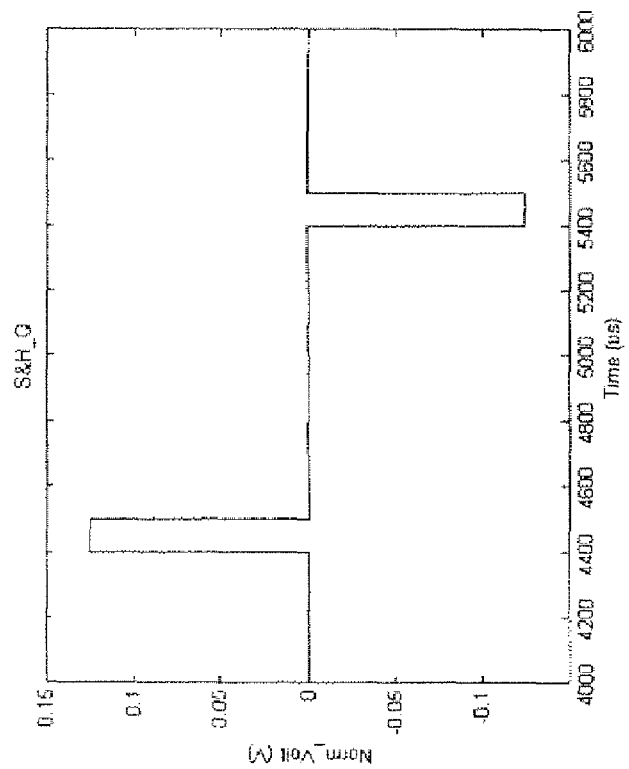
FIG. 10A illustrates sampled values via the integrator and the analog-to-digital converter for the correlation values with the I-component of the wavelet waveform within given intervals in accordance with an embodiment of the present invention.
Figure 10B:
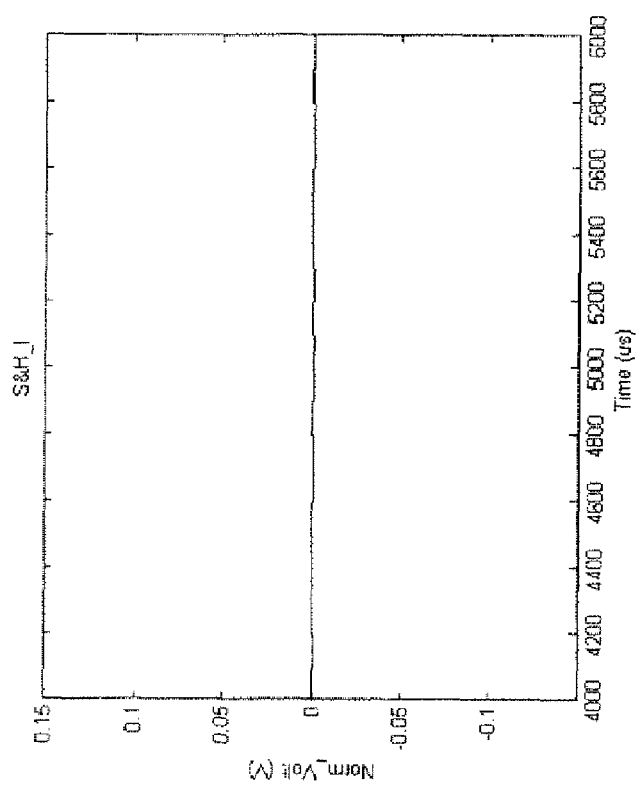
FIG. 10B illustrates sampled values via the integrator and the analog-to-digital converter for the correlation values with the Q-component of the wavelet waveform within given intervals in accordance with an embodiment of the present invention.
Figure 11:
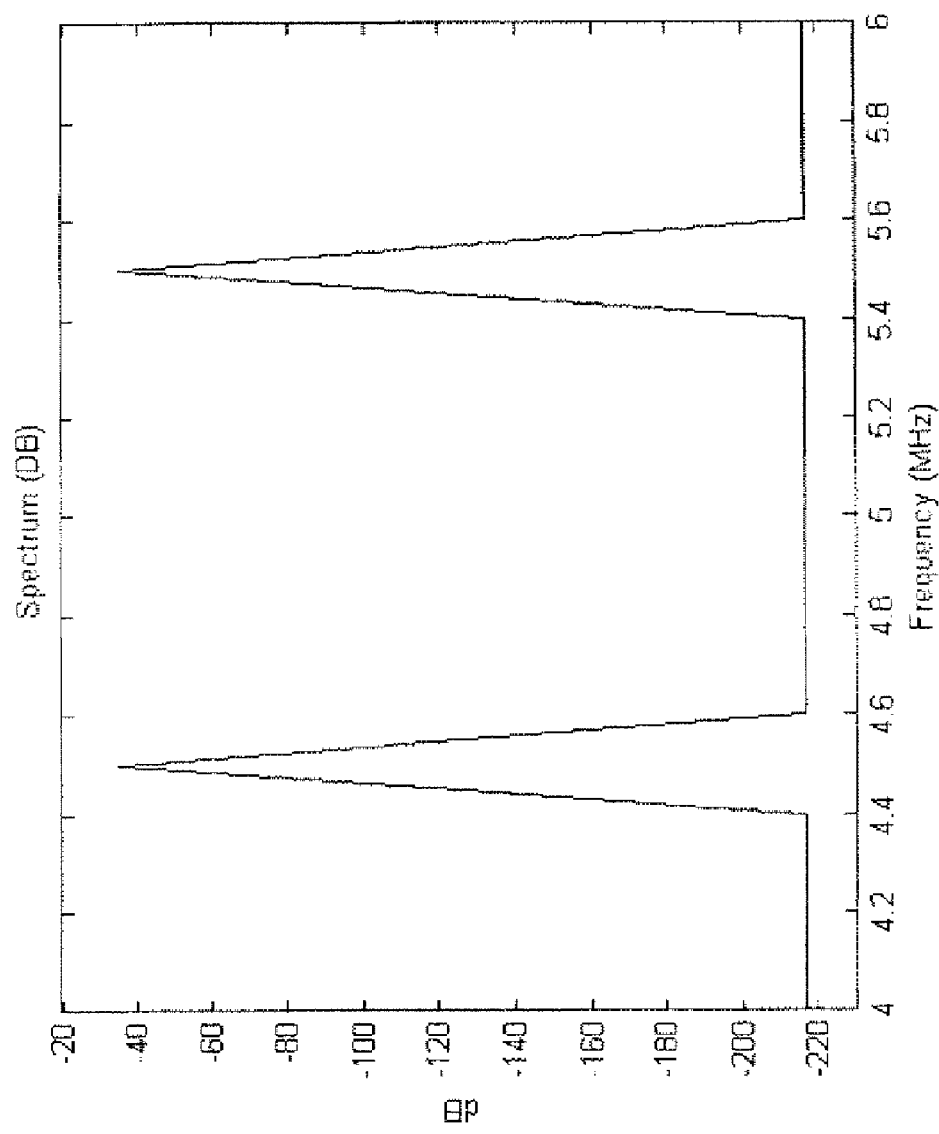
FIG. 11 illustrates an exemplary spectrum shape detected by the spectrum recognition module in the MAC module in accordance with an embodiment of the present invention.
Figure 12B:
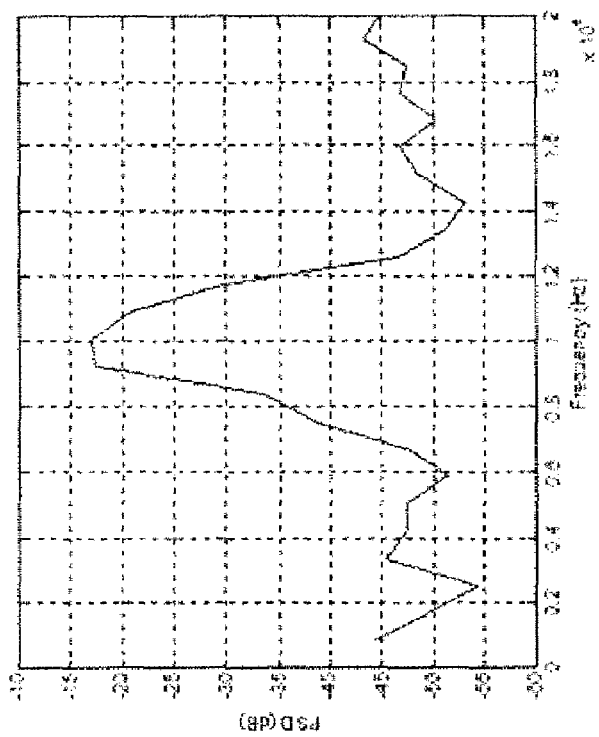
Figure 12A:
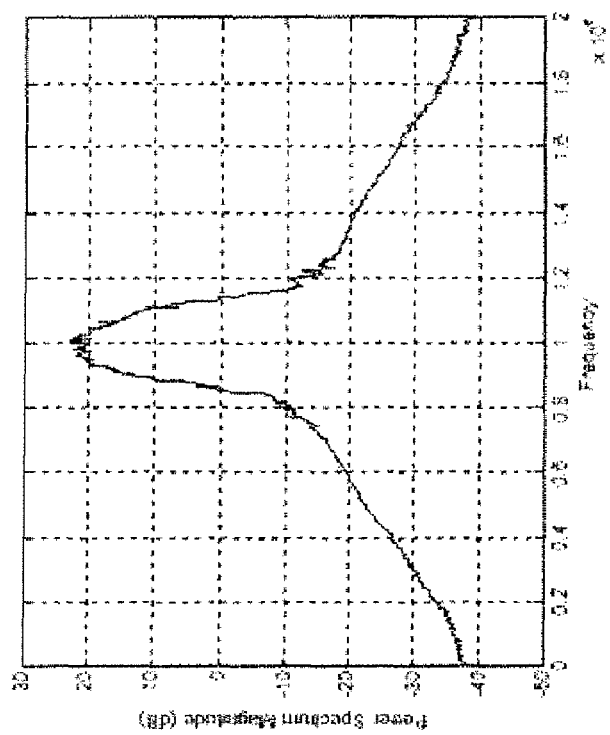
Figure 13B:
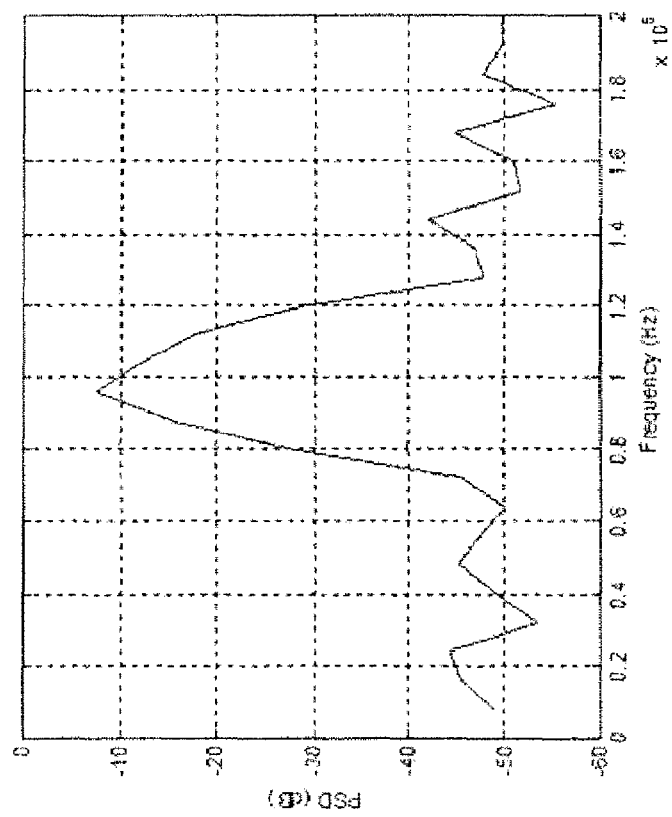
Figure 13A:
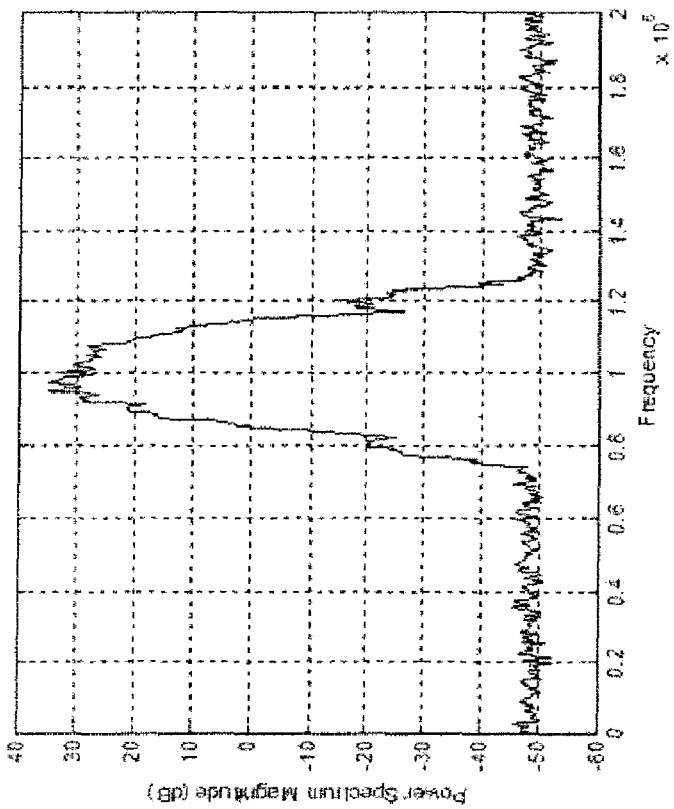
Figure 14B:
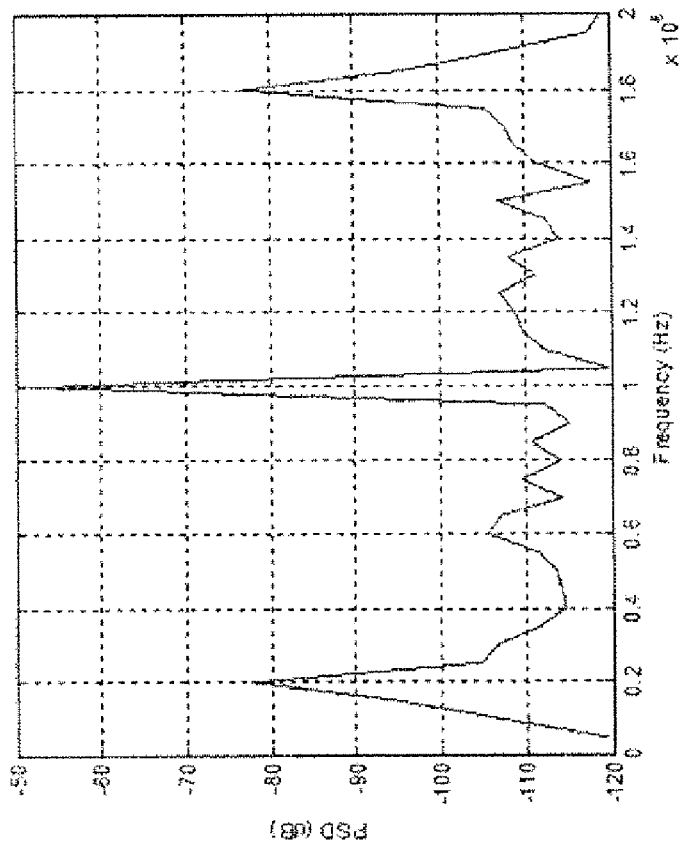
Figure 14A:
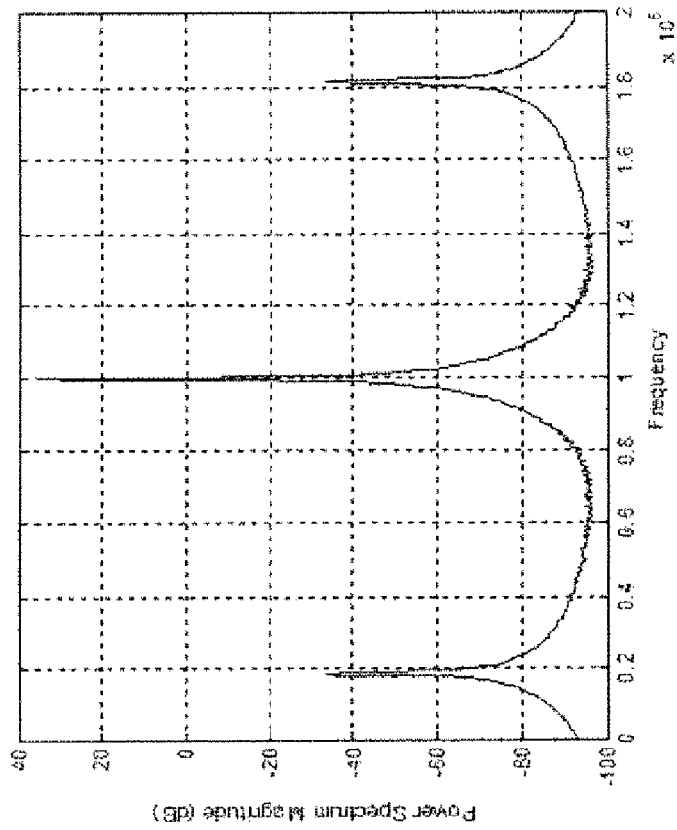
Figure 15B:
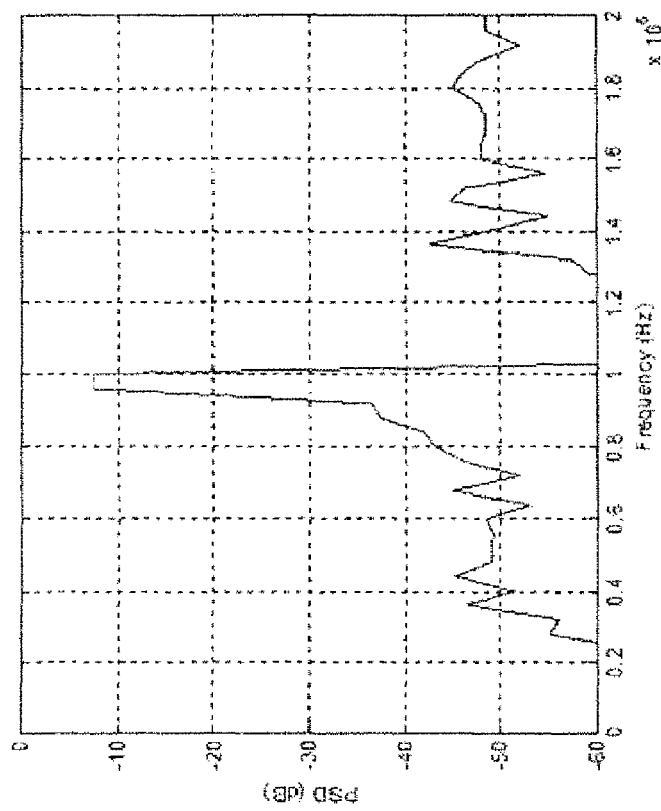
Figure 15A:
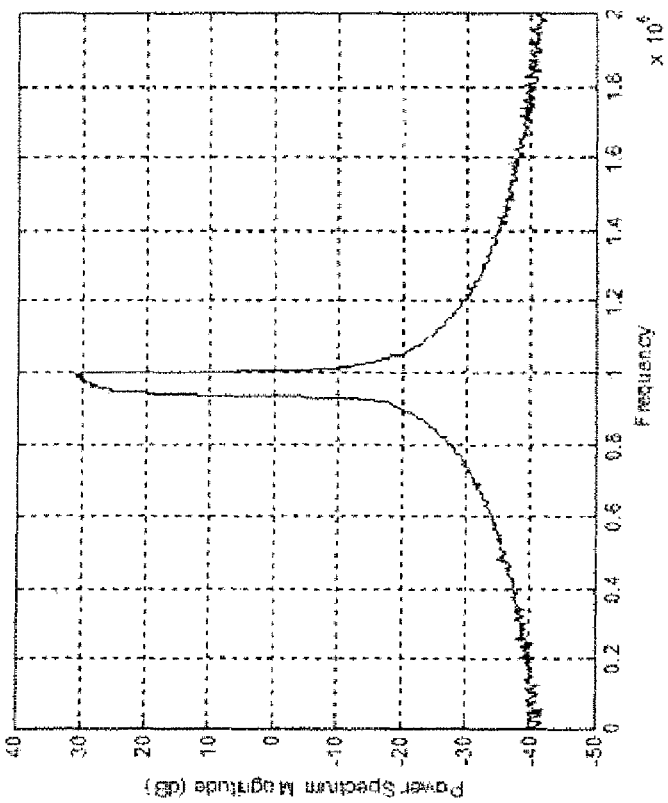
Figure 17B:
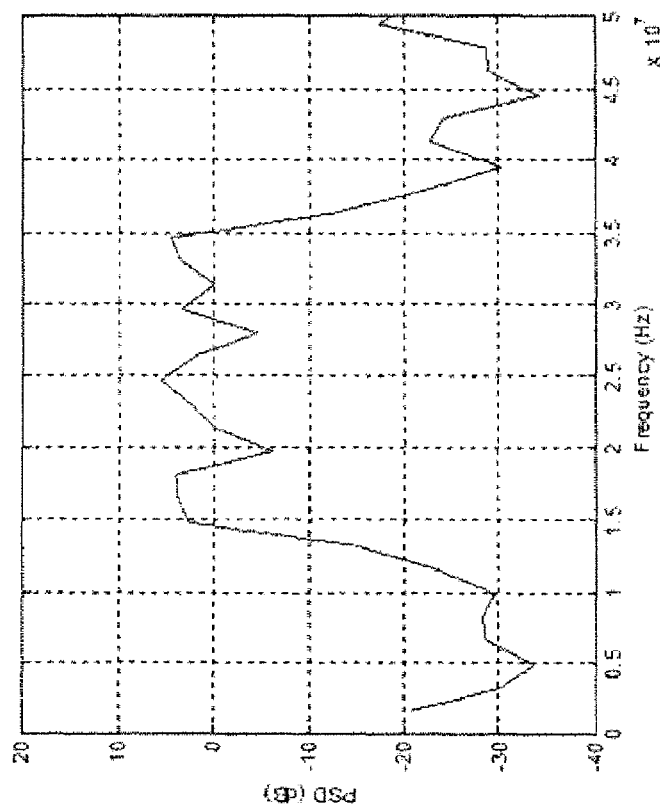
Figure 17A:
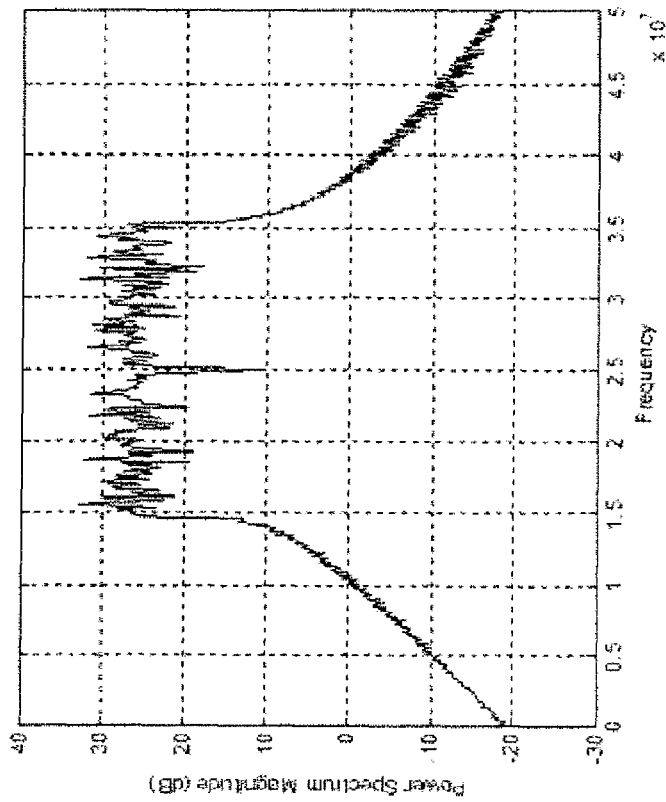

The correlation values y(t) can then be integrated by the analog integrator 408 and sampled by the analog-to-digital converter 118. FIG. 10A shows the sampled values $y_I$ provided by the analog-to-digital converter 118 for these correlation values y(t) with the I-component of the wavelet waveform w(t) within the given intervals. FIG. 10B shows the sampled values $y_Q$ via the analog integrator 408 and the analog-to-digital converter 118 for the correlation values with the Q-component of the wavelet waveform w(t) within the given intervals. The MAC module 124, and perhaps its constituent spectrum recognition module 120, then calculates the magnitudes of those sampled values by taking the square-root for those values, $y_I$ and $y_Q$, as shown in by $|y|=\sqrt{y_I^2(t)+y_Q^2(t)}$ according to an exemplary embodiment of the present invention. The spectrum shape detected by the spectrum recognition module 120 in the MAC module 124 is shown in FIG. 11. As shown in FIG. 11, the detected spectrum shape is well-matched with the expected spectrum shown in FIG. 5B, thereby signifying good detection and recognition of the expected spectrum.

FIGS. 12-17 illustrate simulations of various signal formats detected by exemplary MRSS implementations in accordance with embodiments of the present invention. These signal formats may include GSM. EDGE, wireless microphone (FM), ATDC (VSB), 3G cellular-WCDMA, IEEE802.11a-WLAN (OFDM). In particular, FIG. 12A illustrates the spectrum of a GSM signal and FIG. 12B illustrates the corresponding detected signal spectrum. Likewise. FIG. 13A illustrates the spectrum of an EDGE signal and FIG. 13B illustrates the corresponding detected signal spectrum. FIG. 14A illustrates the spectrum of a wireless microphone (FM) signal and FIG. 14B illustrates the corresponding detected signal spectrum. FIG. 15A illustrates the spectrum of an ATDC (VSB) signal and FIG. 15B illustrates the corresponding detected signal spectrum. FIG. 16A illustrates the spectrum of a 3G-cellular (WCDMA) signal and FIG. 16B illustrates the corresponding detected signal spectrum. FIG. 17A illustrates the spectrum of an IEEE 802.11a-WLAN (OFDM) signal and FIG. 17B illustrates the corresponding detected signal spectrum. One of ordinary skill in the art will recognize that other signal formats may be detected in accordance with MRSS implementations in accordance with embodiments of the present invention.

d. Circuit diagram for Coarse-sensing Block

Figure 18:
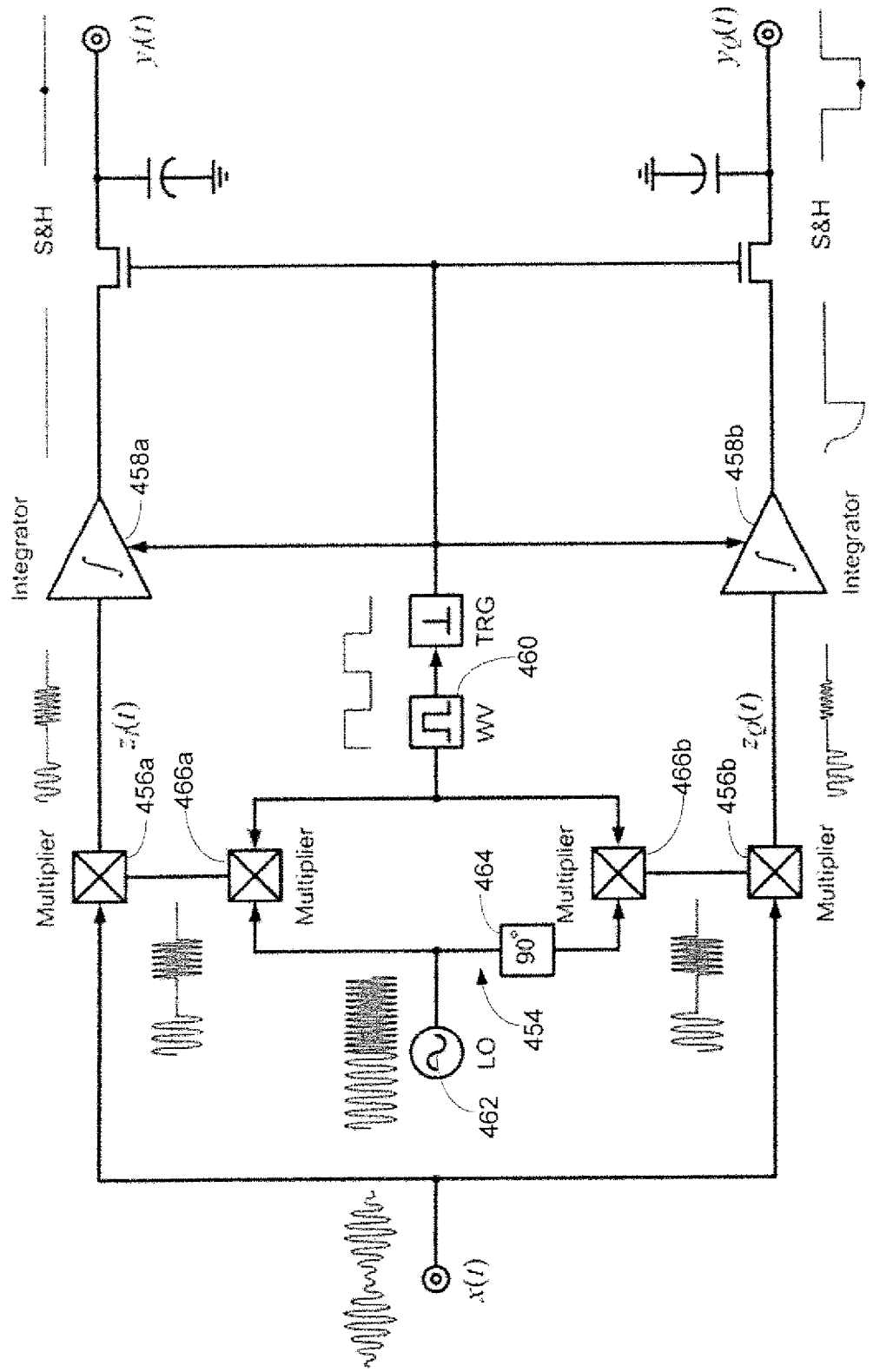
FIG. 18 illustrates an exemplary circuit diagram of the coarse sensing module in accordance with an embodiment of the present invention.

An exemplary circuit diagram of the coarse sensing module 104 shown in FIG. 4 is illustrated in FIG. 18. More specifically, FIG. 18 illustrates a wavelet generator 454, multipliers 456a and 456b, and integrators 458a and 458b. The wavelet generator 454 may be comprised of a wavelet pulse generator 460, a local oscillator (LO) 462, a phase shifter 464 (e.g., a 90° phase shifter), and multipliers 466a and 466b. The wavelet pulse generator 460 may provide envelope signals that determines the width and/or shape of the wavelet pulses v(t). Using multiplier 466a, the wavelet pulse v(t) is multiplied by the I-component of the LO frequency provided by the LO 462 to generate the I-component modulated wavelet pulse w(t). Likewise, using multiplier 466b, the wavelet pulse v(t) is multiplied by the Q-component of the LO frequency, as shifted 90° by the phase shifter 464, to generate the Q-component modulated wavelet pulse w(t).

The respective I- and Q-components of the modulated wavelet pulse w(t) are then multiplied by the respective multipliers 456a and 456b to generate the respective correlation output signals $z_I(t)$ and $z_Q(t)$. The correlation output signals $z_I(t)$ and $z_Q(t)$ are then integrated by the respective integrators 458a and 458b to yield respective correlation values $y_I(t)$ and $y_Q(t)$. While FIG. 18 illustrates a specific embodiment, one of ordinary skill in the art will recognize that many variations of the circuit diagram in FIG. 18 are possible.

2. Fine-sensing Module

In accordance with an exemplary embodiment of the present invention, the fine-sensing module 106 of FIG. 1 may be operative to recognize the periodic features of the input signals unique for each suspect modulation format or frame structure. These periodic features may include sinusoidal carriers, periodic pulse trains, cyclic prefixes, and preambles. More specifically, the fine-sensing module 106 may implement one or more correlation functions for recognizing these periodic features of the input signals. The recognized input signals may include a variety of sophisticated signal formats adopted in the current and emerging wireless standards, including IS-95, WCDMA, EDGE, GSM, Wi-Fi, Wi-MAX, Zigbee, Bluetooth, digital TV (ATSC, DVB), and the like.

According to an embodiment of the present invention, the correlation function implemented for the fine-sensing module 106 may be an Analog Auto-Correlation (AAC) function. The AAC function may derive the amount of the similarity (i.e., the correlation) between two signals. In other words, the correlation between the same waveforms produces the largest value. However, because the data modulated waveform has a random feature because the underlying original data includes random values, the correlation between the periodic signal waveform and the data modulated signal waveform may be ignored. Instead, the periodic feature of a given signal (e.g., modulation format or frame structure) has a high correlation that may be utilized by the AAC function as the signature for the specific signal type. The specific signal type identified by the AAC function in the fine-sensing module 106 may be provided to the signal processing module 126 for mitigation of interference effects.

a. Block Diagram of AAC Implementation

Figure 19:
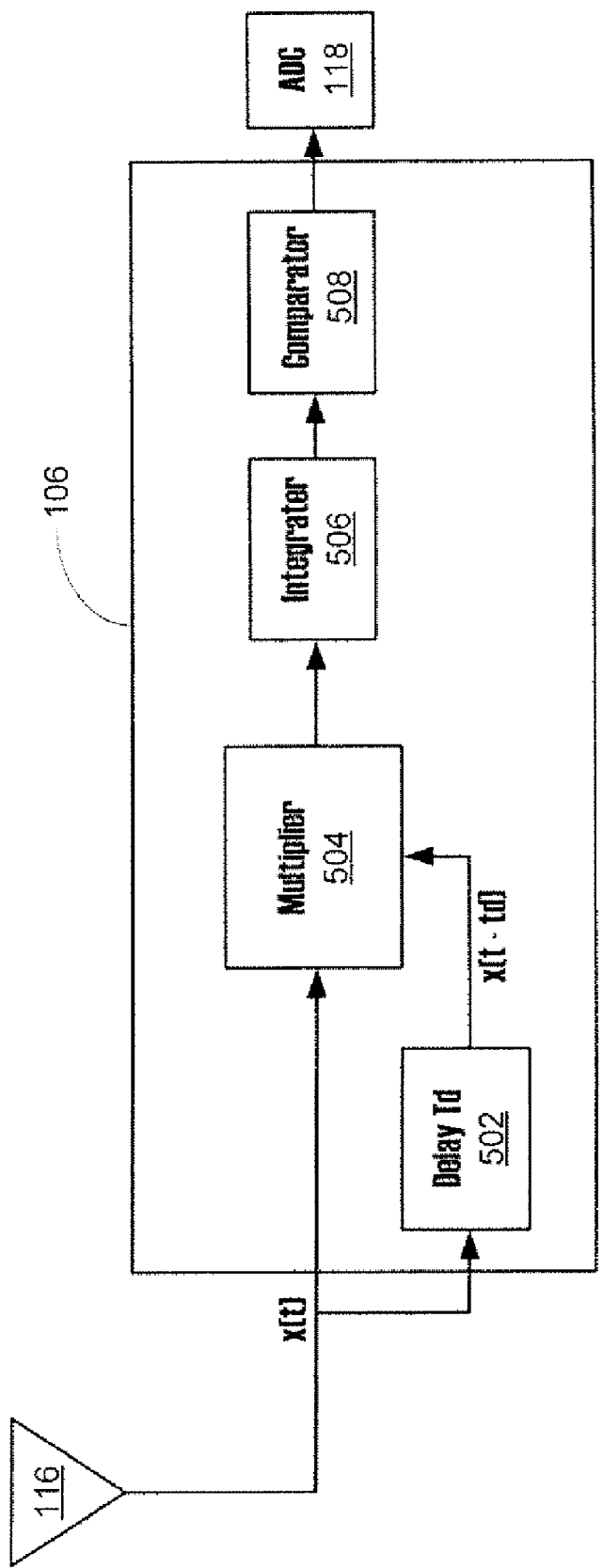
FIG. 19 illustrates a functional block diagram of an exemplary fine-sensing technique utilizing the AAC function in accordance with an embodiment of the present invention.

FIG. 19 illustrates a functional block diagram of an exemplary fine-sensing module 106 utilizing the AAC function in accordance with an embodiment of the present invention. In particular, the fine-sensing module 106 may include an analog delay module 502, an analog multiplier 504, an analog integrator 506, and a comparator 508. The analog correlation values provided at an output of the fine-sensing module 106 may be digitized by an analog-to-digital converter 118, which may be low-speed according to an embodiment of the present invention.

Now referring to the fine-sensing module 106 of FIG. 19, an input RF signal x(t) from the antenna 116 is delayed by a certain delay value $T_d$ by the analog delay module 502. The delay value $T_d$ provided by the analog delay block 502 may be a predetermined and unique value for each periodic signal format. For example, an IEEE 802.11a—WLAN (OFDM) signal may be associated with a first delay value $T_{d1}$ while a 3G-cellular (WCDMA) signal may be associated with a second delay value $T_{d2}$ different from the first delay value $T_{d1}$.

The analog correlation between the original input signal x(t) and the corresponding delayed signal $x(t-T_d)$ may be performed by multiplying or otherwise combining these two signals—the original input signal x(t) and the delayed signal $x(t-T_d)$—with an analog multiplier 504 to form a correlation signal. The correlation signal is then integrated with an analog integrator 506 to yield correlation values. The analog integrator 506 may be a sliding-window integrator according to an exemplary embodiment of the present invention. When correlation values from the integrator 506 are greater than a certain threshold as determined by the comparator 508, the specific signal type for the original input signal may be identified by the spectrum recognition module 120 of the MAC module 124. According to an embodiment of the present invention, the threshold may be predetermined for each signal type. These signal types can include IS-95, WCDMA, EDGE, GSM, Wi-Fi, Wi-MAX, Zigbee, Bluetooth, digital TV (ATSC, DVB), and the like.

Because the exemplary AAC implementation in FIG. 19 processes all the signals in the analog domain, this may allow not only for real-time operation but also low-power consumption. By applying a delay $T_d$ and thus a correlation to the input signal, a blind detection may achieved with no need of any known reference signals. This blind detection may drastically reduce the hardware burden and/or power consumption for the reference signal recovery. Moreover, in accordance with an embodiment of the present invention, the AAC implementation of FIG. 19 may enhance the spectrum-sensing performance when provided in conjunction with the MRSS implementation described above. In particular, once the MRSS implementation detects the reception of a suspicious interferer signal, the AAC implementation may examine the signal and identify its specific signal type based upon its signature.

b. Simulation of the AAC Implementation

Figure 20B:
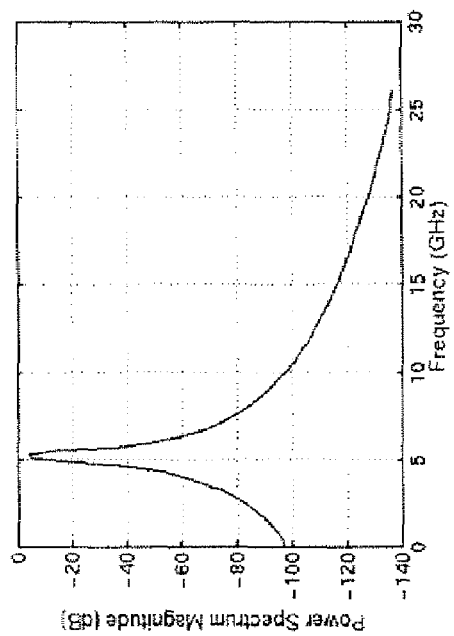
FIG. 20B illustrates the spectrum of an input IEEE802.11a signal to be detected with an AAC implementation in accordance with an embodiment of the present invention.
Figure 20A:
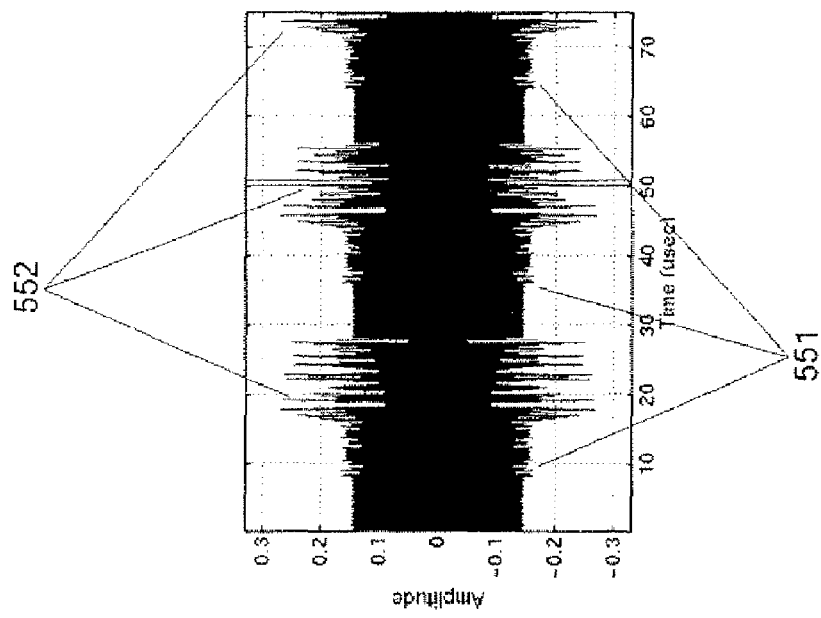
FIG. 20A illustrates an exemplary data OFDM symbol followed by a preamble in accordance with an embodiment of the present invention.

In accordance with an embodiment of the present invention, the AAC implementation of FIG. 19 may be simulated for a variety of signal types. As an example, an IEEE 802.11a—OFDM (Orthogonal Frequency Division Multiplexing) signal may always have synchronization preambles at the beginning of a frame structure. For the simplicity., only one exemplary data OFDM symbol 552 may be followed by an exemplary preamble 551 as shown in FIG. 20A. FIG. 20B illustrates the spectrum of the input IEEE802. 11a signal to be detected with an AAC implementation in accordance with an embodiment of the present invention.

Figure 21A:
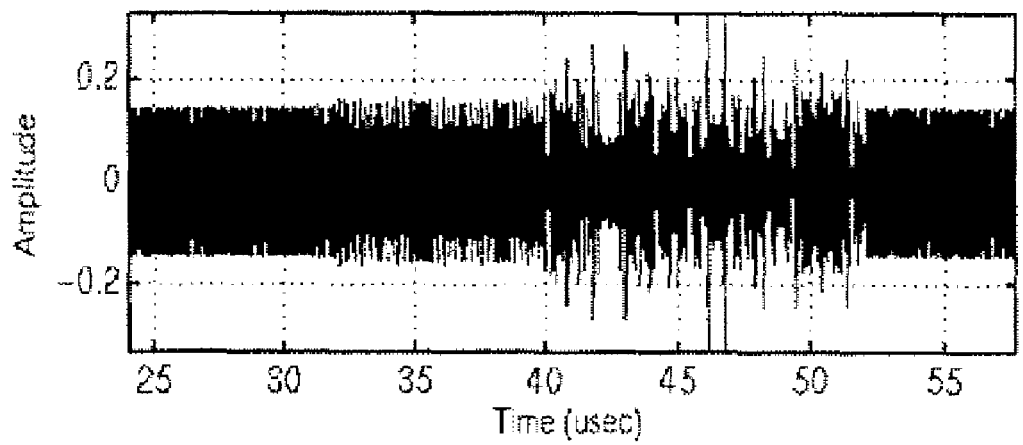
FIG. 21A illustrates an input IEEE802.11a signal
Figure 21B:
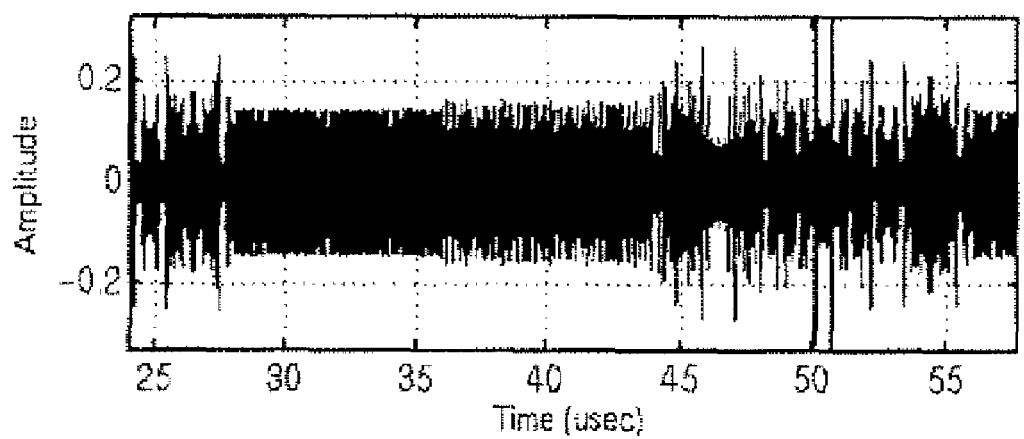
FIG. 21B illustrates a delayed IEEE 802.11a signal in accordance with an embodiment of the present invention.
Figure 22:
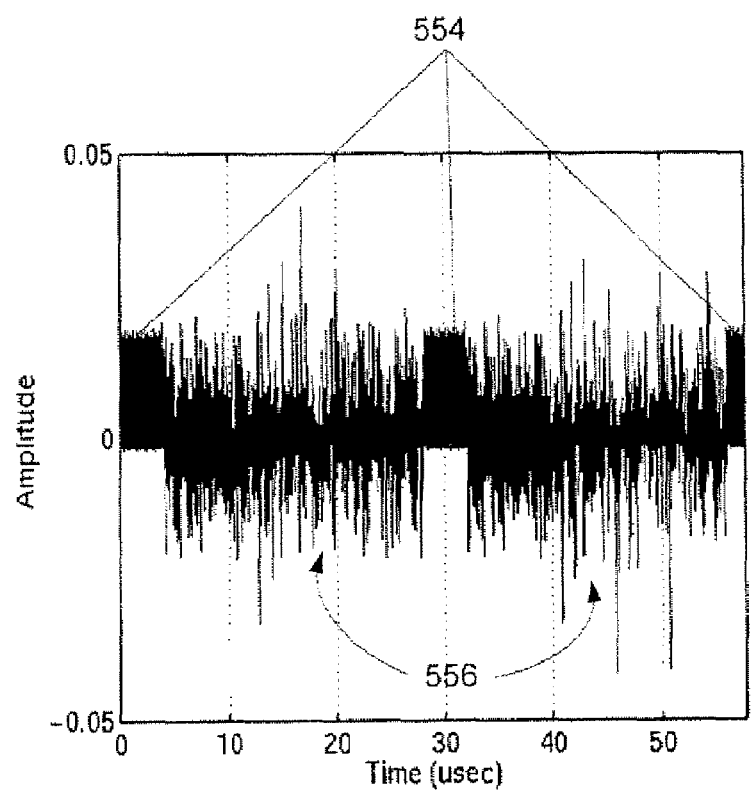
FIG. 22 illustrates a waveform of a correlation between the original input signal and the delayed signal in accordance with an embodiment of the present invention.
Figure 23:
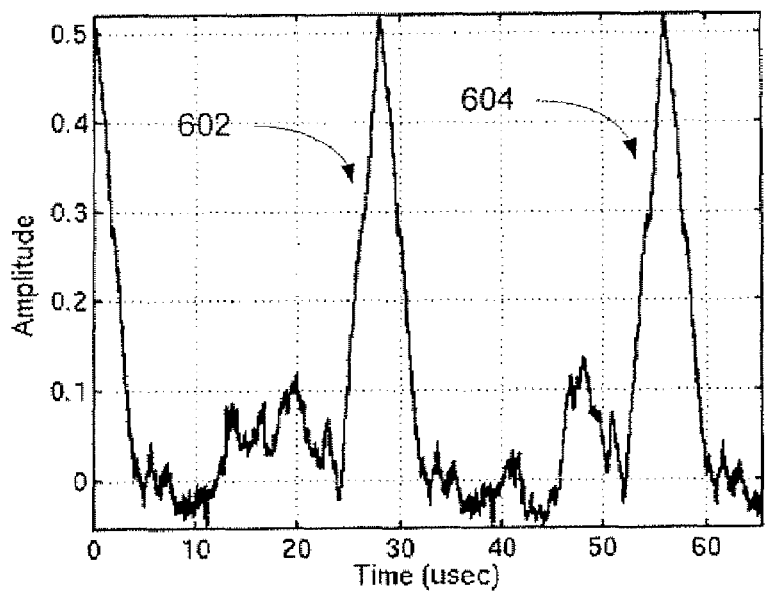
FIG. 23 illustrates a waveform produced by an integrator in accordance with an embodiment of the present invention.

FIG. 21A illustrates the input IEEE802.11a signal x(t) and FIG. 21B illustrates the delayed IEEE 802.11a signal $x(t-T_d)$. FIG. 22 illustrates a waveform of a correlation between the original input signal x(t) and the delayed signal $x(t-T_d)$, as provided at an output of the multiplier 504. The resulting correlation waveform shown in FIG. 22 may have consecutive positive values 554 for the preambles 551. The result of the integrator 506 as shown in FIG. 23 may have peaks 602, 604 for the preamble 551 locations within the IEEE802. 11a frame structure. Meanwhile, the correlation for the modulated data symbols 552 has random values 556, which can be ignored after integration by the analog integrator 506. By comparing the predetermined threshold Vth utilizing a comparator 508 with the resulting waveform shown in FIG. 23, the exemplary AAC implementation of FIG. 19 may determine the reception of the IEEE 802.11a—OFDM signal.

Many variations of the AAC implementation described with respect to FIG. 19 are possible. In an alternative embodiment, the output of the integrator 506 may be digitized by the analog-to-digital converter 118 before a comparison to the threshold Vth is performed by comparator 508. While the analog-to-digital converter 118 may be shared between the coarse-sensing module 104 and the fine-sensing module 106 in one embodiment, separate analog-to-digital converters may be provided for both the coarse-sensing module 104 and the fine-sensing module 106 in other embodiments. Likewise, the multiplier 504 and the integrator 506 of the fine-sensing module 106 may either be the same as or distinct from the multiplier 406 and the integrator 408 in the coarse-sensing module 104. Many other variations will be known to one of ordinary skill in the art.

C. Signal Processing Block

Referring back to FIG. 1, a signal processing module 126 is disclosed, which may be a physical layer block according to an exemplary embodiment of the present invention. The signal processing module 126 may provide baseband processing, including one or more modulation and demodulation schemes. In addition, the signal processing module 126 may also provide interference mitigation, perhaps based upon any identified interferer signals. Furthermore, the signal processing module 126 may be operative to reconfigure the radio front-end, including the transmitter 110 and/or receiver 112, perhaps based at least in part upon the available spectrum. For example, the signal processing block may adjust the transmission power control for the transmitter 110 or tune a filter for the receiver 112 to operate within a particular frequency range. One of ordinary skill in the art will readily recognize that other baseband processing may be provided by the signal processing module 126 as necessary or desirable.

D. Frequency-agile Radio Front End

Figure 24:
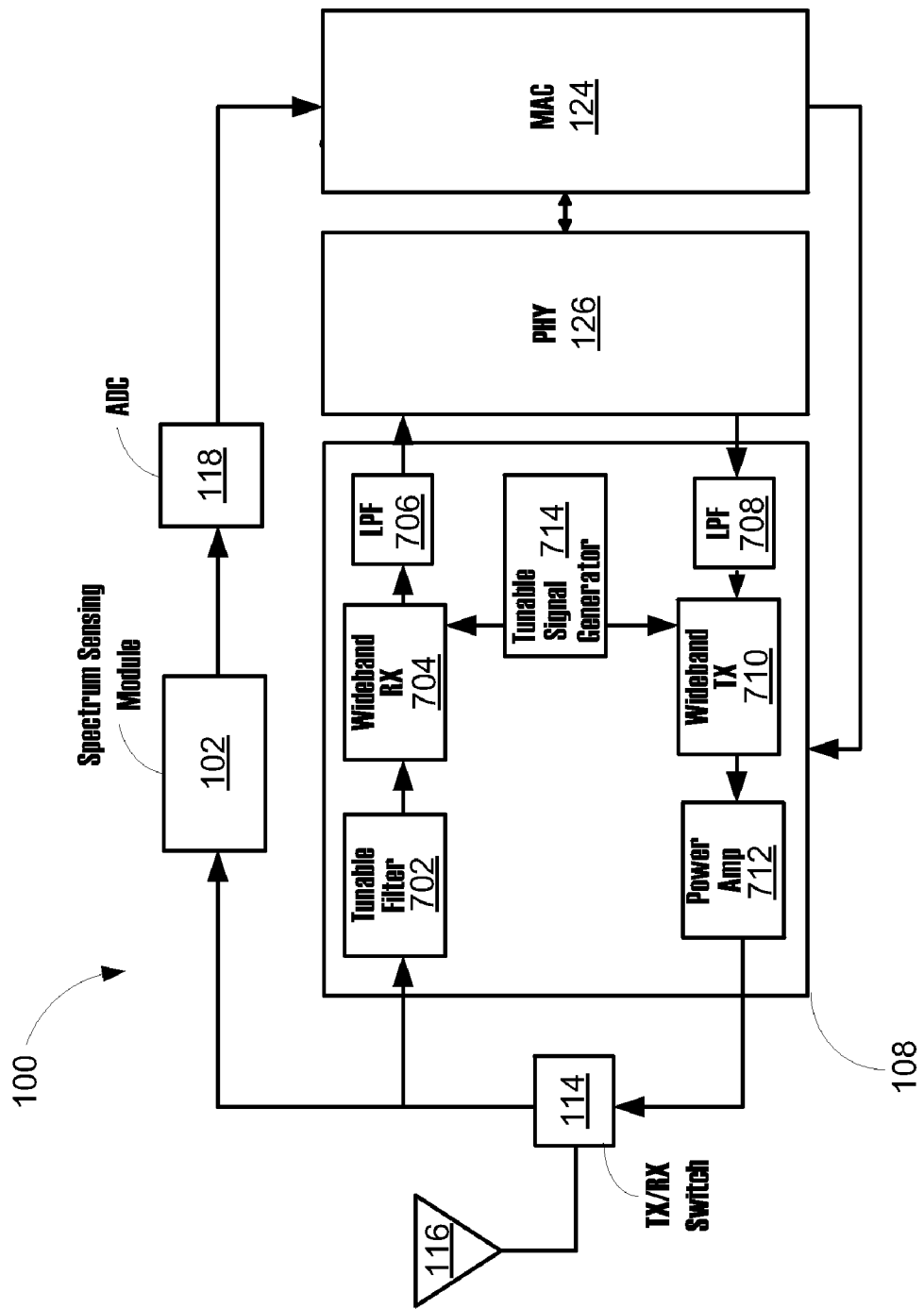
FIG. 24 illustrates an exemplary configuration for a frequency-agile radio front-end in accordance with an embodiment of the present invention.

FIG. 24 illustrates an exemplary configuration for a frequency-agile radio front-end 108 in accordance with an embodiment of the present invention. In particular, the receive portion of the radio front-end 108 may include one or more tunable filters 702, a wideband receiver 704, and one or more low pass filters 706. The tunable filter 702 may comprise a wavelet generator and a multiplier according to an exemplary embodiment of the present invention. The wideband receiver 704 may include one or more frequency stages and one or more downconverters as necessary. In addition, the transmit portion of the radio front-end 108 may include one or more low-pass filters 708, a wideband transmitter 710, and one or more power amplifiers 712. The wideband transmitter 710 may also include one or more frequency stages and one or more upconverters as necessary. Furthermore, the wideband receiver 704 and transmitter 710 may be in communication with a tunable signal generator 714. One of ordinary skill in the art will recognize that the components of the frequency-agile front-end 108 may be varied without departing from embodiments of the present invention.

Figure 2:
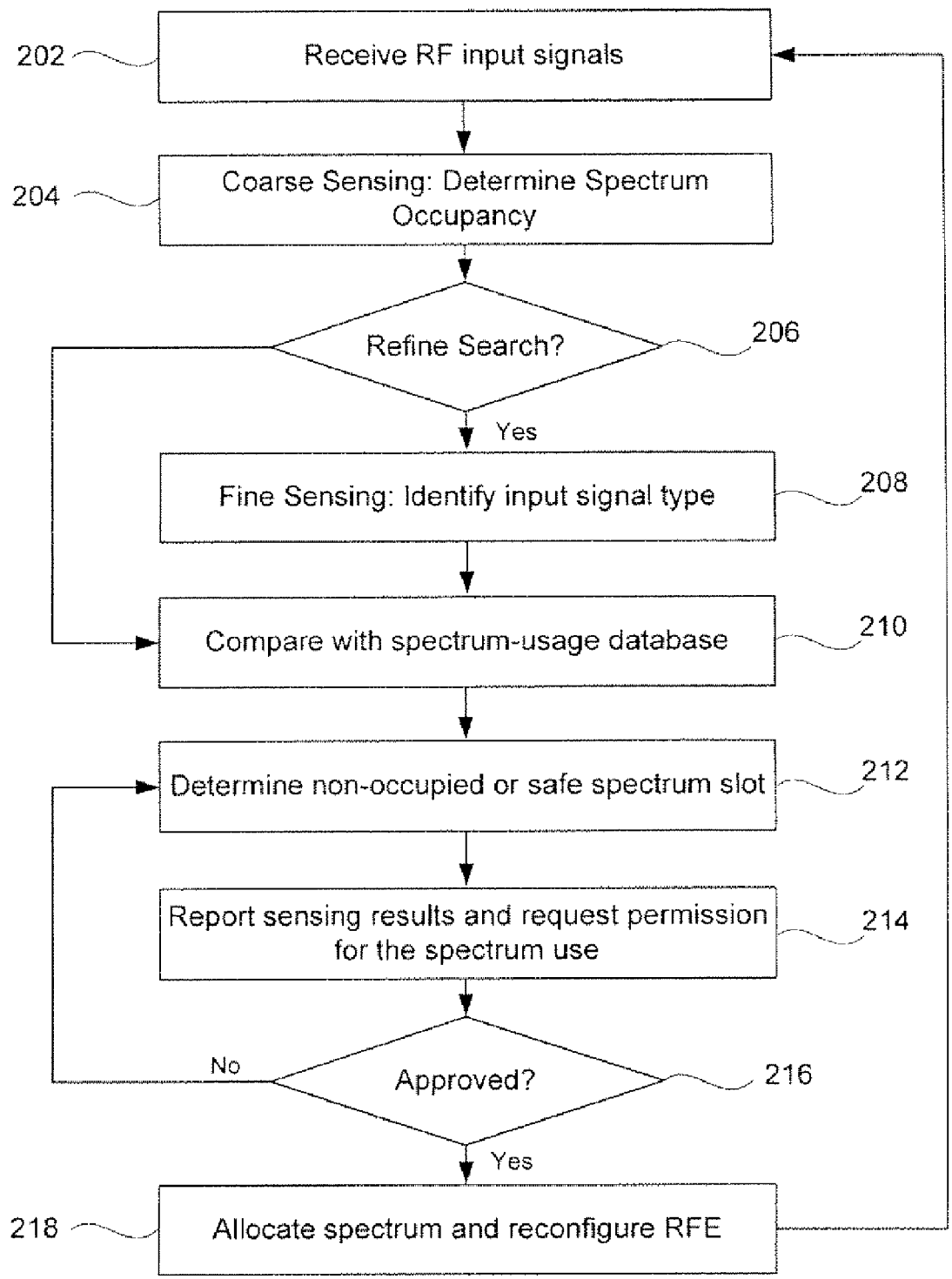
FIG. 2 illustrates an exemplary flowchart of the cognitive radio system of FIG. 1.

As stated previously with respect to FIGS. 1 and 2, the MAC module 124 processes the digitized data (e.g., via ADC 118) from the spectrum sensing module 102 to allocate the available spectrum for a safe (e.g., unoccupied or non-interfering) cognitive radio 100 link. Additionally, the MAC module 124 provides the reconfiguration control signal to the radio front-end 108 for the optimal radio link in the allocated frequencies. Then, the radio front-end 108 changes the operating RF frequency to the corresponding frequency value in accordance with its frequency agile operation. More specifically, either or both of the tunable filter 702 and the tunable signal generator 714 may change their operating frequencies to select the signals within the corresponding frequency region. In the meantime, based upon the MAC module 124 control information, the PHY signal processing module 126 may enhance the link performance with the adaptive modulation and interference mitigation technique.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A radio frequency (RF) spectrum-sensing system, comprising:
   a wavelet waveform generator providing a plurality of modulated wavelet pulses, wherein the plurality of modulated wavelet pulses are generated by modulating a plurality of wavelet pulses with a carrier signal, wherein the carrier signal is swept across varying frequencies;
   an analog multiplier that combines the plurality of modulated wavelet pulses with an input signal to form a correlation signal;
   an analog integrator that receives the correlation signal, wherein the analog integrator determines correlation values from integrating the correlation signal; and
   a spectrum recognition module in communication with the analog integrator that determines an available spectrum segment based at least in part on the correlation values.

2. The system of claim 1, wherein the plurality of modulated wavelet pulses comprise a sinusoidal carrier signal and an envelope signal, wherein the envelope signal determines at least in part, a width and shape of the modulated wavelet pulses.

3. The system of claim 1, wherein at least one of a carrier frequency, width, and shape associated with the modulated wavelet pulses is reconfigurable.

4. The system of claim 1, further comprising a driver amplifier, wherein the driver amplifier amplifies the input signal.

5. The system of claim 1, wherein the correlation values are digitized prior to receipt by the spectrum recognition module.

6. The system of claim 1, wherein the spectrum recognition module determines the available spectrum based at least in part on a spectrum usage database, wherein the spectrum usage database includes information associated with one or more known signal types.

7. A method of determining radio frequency (RF) spectrum usage, comprising:
   generating, by a wavelet waveform generator, a plurality of modulated wavelet pulses, wherein the plurality of modulated wavelet pulses are generated by modulating a plurality of wavelet pulses with a carrier signal, wherein the carrier signal is swept across varying frequencies;
   combining, by an analog multiplier, the modulated wavelet pulses with an input signal to form a correlation signal;
   calculating correlation values by integrating the correlation signal with an analog integrator; and
   determining an available spectrum segment based at least in part on the correlation values.

8. The method of claim 7, wherein the plurality of wavelet pulse are Gaussian wavelet pulses or Hanning wavelet pulses.

9. The method of claim 7, wherein the plurality of modulated wavelet pulses comprise a sinusoidal carrier signal and an envelope signal.

10. The method of claim 9, wherein the envelope signal determines at least in part, a width and shape of the modulated wavelet pulses.

11. The method of claim 7, further comprising reconfiguring at least one of a carrier frequency, width, and shape associated with the modulated wavelet pulses.

12. The method of claim 7, wherein combining the modulated wavelet pulses with an input signal comprises multiplying the modulated wavelet pulses with the input signal.

13. The method of claim 7, wherein the input signal is amplified by a driver amplifier prior to being combined with the modulated wavelet pulses.

14. The method of claim 7, further comprising digitizing the correlation values, wherein determining the available spectrum includes determining the available spectrum segment based at least in part on the digitized correlation values.

15. The method of claim 7, wherein determining an available spectrum segment comprises determining the available spectrum based at least in part on the correlation values and a spectrum usage database, wherein the spectrum usage database includes information associated with one or more known signal types.

16. The method of claim 15, wherein the spectrum usage database is updated based upon information transmitted from a remote station.

17. A radio frequency (RF) spectrum-sensing apparatus, comprising:
   an antenna for receiving input signals;
   a wavelet generator that provides a plurality of modulated wavelet pulses, wherein the plurality of modulated wavelet pulses are generated by modulating a plurality of wavelet pulses with a carrier signal, wherein the carrier signal is swept across varying frequencies;
   an analog multiplier for combining the input signals and the plurality of modulated wavelet pulses to form a correlation signal; and
   an analog integrator that integrates the correlation signal to calculate correlation values.

18. The apparatus of claim 17, wherein the wavelet generator includes a local oscillator and a generator for generating envelope signals.

19. The apparatus of claim 18, wherein the envelope signals determine a width and shape of the modulated wavelet pulses.

20. The apparatus of claim 17, wherein the wavelet generator is operative to form I-Q modulated wavelet pulses.

21. The apparatus of claim 17, wherein the correlation values above one or more thresholds are operative to provide an indication of spectrum occupancy.

* * * * *